United States Patent
Deshpande et al.

(10) Patent No.: US 12,456,894 B2
(45) Date of Patent: Oct. 28, 2025

(54) AXIAL FLUX ELECTRIC MACHINE POLE PIECE WITH CONDUCTIVE RIBBONS

(71) Applicant: Conifer Systems, Inc., Middletown, DE (US)

(72) Inventors: Yateendra B Deshpande, Sunnyvale, CA (US); Ankit Somani, Sunnyvale, CA (US)

(73) Assignee: Conifer Systems, Inc., Middletown, DE (US)

( * ) Notice: Subject to any disclaimer, the term of this patent is extended or adjusted under 35 U.S.C. 154(b) by 158 days.

(21) Appl. No.: 18/241,159

(22) Filed: Aug. 31, 2023

(65) Prior Publication Data

US 2024/0079922 A1    Mar. 7, 2024

Related U.S. Application Data

(60) Provisional application No. 63/403,281, filed on Sep. 1, 2022.

(51) Int. Cl.
  *H02K 1/18* (2006.01)
  *H02K 3/18* (2006.01)
  (Continued)

(52) U.S. Cl.
  CPC ............ *H02K 3/18* (2013.01); *H02K 1/182* (2013.01); *H02K 3/325* (2013.01); *H02K 21/24* (2013.01); *H02K 2203/15* (2013.01)

(58) Field of Classification Search
  CPC .... H02K 1/182; H02K 1/2793; H02K 1/2795; H02K 1/2796; H02K 1/2798; H02K 3/04;
  (Continued)

(56) References Cited

U.S. PATENT DOCUMENTS 3,247,476 A * 4/1966 Pintell .................. H01F 30/02
                                              336/200
3,482,131 A * 12/1969 Lytle ...................... H02K 3/04
                                              310/268
(Continued)

FOREIGN PATENT DOCUMENTS

CN    111313586 A  *  6/2020   ............... H02K 3/04
CN    114142643 A  *  3/2022   ........... H02K 15/043
(Continued)

OTHER PUBLICATIONS

Luo et al, Machine Translation of CN111313586, Jun. 2020 (Year: 2020).*
(Continued)

*Primary Examiner* — Eric Johnson
(74) *Attorney, Agent, or Firm* — Daylight Law, P.C.

(57) ABSTRACT

Axial flux electric machines and associated methods are disclosed herein. One disclosed axial flux electric machine includes a stator having a plurality of pole pieces, a rotor spaced apart from the stator in an axial direction of the axial flux electric machine, and a coiled ribbon of conductive material forming at least part of a pole piece in the plurality of pole pieces. An axial direction of the coiled ribbon of conductive material is substantially parallel to the axial direction of the axial flux electric machine. In some embodiments of the disclosed axial flux electric machine a coiled ribbon of soft magnetic material is coiled with a coiled ribbon of conductive material into an interleaved composite material coil which forms at least part of a pole piece for an axial flux electric machine.

26 Claims, 21 Drawing Sheets

(51) Int. Cl.
*H02K 3/32* (2006.01)
*H02K 21/24* (2006.01)

(58) Field of Classification Search
CPC .. H02K 3/15; H02K 3/30; H02K 3/32; H02K 3/325; H02K 3/34; H02K 21/24
See application file for complete search history.

(56) References Cited

U.S. PATENT DOCUMENTS

| | | | |
|---|---|---|---|
| 6,891,600 B2 | 5/2005 | Frissen et al. | |
| 7,596,856 B2 | 10/2009 | Berwald et al. | |
| 2004/0080233 A1* | 4/2004 | Matsushita | H02K 37/14 310/257 |
| 2006/0055271 A1* | 3/2006 | Kaneko | H02K 1/17 310/154.06 |
| 2006/0220491 A1* | 10/2006 | Takeuchi | H02K 3/26 310/179 |
| 2006/0267439 A1* | 11/2006 | Rajasingham | H02K 3/12 310/201 |
| 2010/0253173 A1* | 10/2010 | Miyata | H02K 21/24 310/208 |
| 2013/0009508 A1* | 1/2013 | Takamatsu | H02K 1/2796 310/156.32 |
| 2013/0342054 A1* | 12/2013 | Long | H02K 11/25 310/71 |
| 2016/0133371 A1* | 5/2016 | Stefanescu | H01F 7/20 335/297 |
| 2021/0143700 A1 | 5/2021 | Yao et al. | |
| 2022/0302789 A1* | 9/2022 | Jensen | H02K 3/47 |

FOREIGN PATENT DOCUMENTS

| | | | | |
|---|---|---|---|---|
| GB | 2475095 A | * | 5/2011 | ............... H02K 1/14 |
| WO | WO-2010130318 A1 | * | 11/2010 | ......... H01F 27/2847 |
| WO | WO-2021164943 A1 | * | 8/2021 | ............... H02K 1/20 |

OTHER PUBLICATIONS

Fang et al, Machine Translation of CN114142643, Mar. 2022 (Year: 2022).*
Written Opinion of the International Preliminary Examining Authority from International Application No. PCT/US23/31847 dated Jul. 18, 2024, 11 pages.
Written Opinion of the International Preliminary Examining Authority from International Application No. PCT/US23/31847 dated Dec. 6, 2024, 10 pages.
International Search Report and Written Opinion from International Application No. PCT/US23/31847 dated Feb. 12, 2024, 19 pages.

* cited by examiner

AXIAL FLUX ELECTRIC MACHINE POLE PIECE WITH CONDUCTIVE RIBBONS

CROSS REFERENCE TO RELATED APPLICATIONS

This application claims the benefit of U.S. Provisional Patent Application No. 63/403,281 filed Sep. 1, 2022, which is incorporated by reference herein in its entirety for all purposes.

BACKGROUND

Axial flux electric machines were first patented in U.S. Pat. No. 405,858 by Nikola Tesla in 1889. However, the usage of such machines in the commercial space had been largely rare until the invention of the high-performance Neodymium-Iron-Boron (Nd—Fe—B) permanent magnet material in 1983. Since then, axial flux electric machines have gained widespread adoption on a rapid scale due to their high efficiency and compact nature as compared to other technologies. The emergence of environmentally friendly technologies like electric vehicles have further boosted the application space of axial flux electric machines. Today, axial flux electric machines are used in electric cars, robots of various sizes and types, and electric or hybrid propulsion systems for aircraft. It is generally desirable to reduce the power losses produced in electric machines to thereby improve the machines' energy conversion efficiency. It is also desirable to keep electric machines lightweight and compact and to reduce their upfront manufacturing costs.

Axial flux electric machines typically comprise a stationary assembly and a rotating assembly. An axial flux electric machine comprises, in its most basic form, at least three parts: a stator, a rotor, and a rotor shaft. Stators are stationary parts, whereas rotors and rotor shafts are rotating parts. An axial flux electric machine can also include more than one stator or more than one rotor. Two examples of axial flux electric machine are shown in FIG. 1 in which the axial cross section 100 shows an axial flux electric machine having one rotor and two stators, and axial cross section 110 shows an axial flux electric machine having one stator and two rotors. Radial cross section 111 shows a stator in either axial flux electric machine. Radial cross section 112 shows a rotor in either axial flux electric machine. As used herein the term radial cross section refers to the view provided by looking at the axial flux electric machine in the direction of the axis of the axial flux electric machine and the term axial cross section refers to the view provided by looking at the axial flux electric machine in-line with a radius of a rotor of the axial flux electric machine. The axial flux electric machine functions by exchanging electric energy and the rotational momentum of the rotating parts using a magnetic field that is in the direction of motion of the rotating parts.

The manner in which electrical energy and rotational momentum are exchanged in an axial flux electric machine depends on the specific design of the machine. With respect to axial electric motors, the design can include permanent magnets and controllably magnetized magnets. The permanent magnets can be on either the rotor or the stator and the controllably magnetized magnets can be on either the rotor or the stator. Stator 101 and rotor 102 can be the stators and rotors on the two different kinds of illustrated axial flux electric machines as illustrated in FIG. 1. In the provided examples, the permanent magnets are on the rotor while the stator can be controllably magnetized to rotate the rotor. However, in alternative examples, the permanent magnets are on the stator and the rotor can be controllably magnetized.

The controllably magnetized magnets can include conductive coil windings and soft magnetic material. In the axial flux electric machines of FIG. 1, the stator comprises coil windings 105 wherein the coils are made of conductive material, and terminals of the electrically conductive coils are exposed externally to be energized by an external electrical circuit. Typical conductive materials for coils are aluminum and copper. As shown in FIG. 1, a conductive wire is coiled around a trapezoidal shaped pole piece 106 to form coil windings 105. Such pole pieces are manufactured using complicated molding processes using soft magnetic materials and laminations. The soft magnetic material is what allows the device to be configurably magnetized under the influence of current applied to the coiled wire.

The rotor can be connected to a rotor shaft to transfer the rotational momentum of the rotor to an external system. As illustrated in FIG. 1, a rotor 102 can house a circular array of specifically spaced, alternating pole, permanent magnets 103 and be coupled to rotor shaft 109. The rotor is typically supported by one or more bearings 108 that allow rotation of the rotor about an axis of rotation while maintaining a substantially uniform air-gap between the rotor and stator. In the example of an axial flux motor in accordance with the examples in FIG. 1, when the coils of the stator are energized, the current flowing through the coils generates magnetic fields between two adjacent coils having opposite polarities, which alternate, and the magnetic flux generated by the coils repels or attracts a permanent magnet close to them, inducing torque and rotation of the rotor. The rotor shaft coupled to the rotor, in turn, transfers the torque to an externally connected load.

SUMMARY

Electric machines that convert electrical power to rotational mechanical power or vice versa and associated methods and systems are disclosed herein. The electrical machines may be permanent magnet synchronous alternating current (AC) electric machines in the form of axial flux electric machines. The axial flux electric machines may be either motors or generators.

There are several drawbacks to prior art axial flux electric machines. For example, the machines do not utilize the flux carrying capacity of electrical steel and underutilize the magnetic flux of the permanent magnets. Furthermore, manufacturing of trapezoidal shaped pole pieces, which typically uses laminated electrical steel, is challenging as standard electrical steel punching and joining methods are not readily employable. Another possibility to resolve this challenge is to employ a soft magnetic composite, formed using such soft magnetic materials as iron or silicon steel, which allows sintering individual pole pieces into a desired shape and concentrates the rotor's permanent magnet flux. However, soft magnetic composites typically achieve lower saturation levels of magnetic flux.

In specific embodiments of the invention disclosed herein, a pole piece with conductive ribbons is provided that, in specific embodiments, overcomes the drawbacks of the prior art approaches described above and allows for an alternative low-cost manufacturing process while significantly reducing electrical machine losses.

In specific embodiments of the invention, an axial flux electric machine is provided. The axial flux electric machine comprises a stator having a plurality of pole pieces, a rotor spaced apart from the stator in an axial direction of the axial flux electric machine, and a coiled ribbon of conductive material forming at least part of a pole piece in the plurality of pole pieces. An axial direction of the coiled ribbon of conductive material is substantially parallel to the axial direction of the axial flux electric machine. In some embodiments, the axial flux electric machine further comprises a coiled ribbon of soft magnetic material forming at least part of the pole piece. In these embodiments, the coiled ribbon of soft magnetic material and the coiled ribbon of conductive material can be commonly coiled in an interleaved composite material coil. In some embodiments, the axial flux electric machine further comprises a coiled ribbon of insulative material forming at least part of the pole piece wherein the coiled ribbon of soft magnetic material, the coiled ribbon of conductive material, and the coiled ribbon of insulative material are commonly coiled in the interleaved composite material coil. In some embodiments, the conductive material is at least partially sheathed in insulating material such that the ribbon of conductive material comprises a conductive core that is insulated from ohmic contact when the conductive material is coiled either upon itself or into an interleaved composite material coil. The sheathing can be around the entire circumference of a segment of the ribbon or it can be partial and only cover a top or bottom side of a segment of the ribbon.

In specific embodiments of the invention, an axial flux electric machine is provided. The axial flux electric machine comprises a stator having a plurality of pole pieces, a rotor spaced apart from the stator in an axial direction of the axial flux electric machine, and a coil of conductive material forming at least part of a pole piece in the plurality of pole pieces. The coil of conductive material forms the pole piece as a free-standing structure.

In specific embodiments of the invention, an axial flux electric machine is provided. The axial flux electric machine comprises a stator having a plurality of pole pieces, a rotor spaced apart from the stator in an axial direction of the axial flux electric machine, and a coiled ribbon of conductive material forming at least part of a pole piece in the plurality of pole pieces. The radial surface area of the coiled ribbon forms at least half of a radial surface area of the pole piece. As used herein, the term "radial surface area" refers to a surface area measured perpendicular to the axial direction of the axial flux electric machine.

BRIEF DESCRIPTION OF THE DRAWINGS

The accompanying drawings illustrate various embodiments of the systems, the methods, and various other aspects of the disclosure. A person with ordinary skills in the art will appreciate that the illustrated element boundaries (e.g., boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION

Reference will now be made in detail to implementations and embodiments of various aspects and variations of systems and methods described herein. Although several exemplary variations of the systems and methods are described herein, other variations of the systems and methods may include aspects of the systems and methods described herein combined in any suitable manner having combinations of all or some of the aspects described.

Methods and systems related to electric machines in accordance with the summary above are disclosed in detail herein. The methods and systems disclosed in this section are nonlimiting embodiments of the invention, are provided for explanatory purposes only, and should not be used to constrict the full scope of the invention. It is to be understood that the disclosed embodiments may or may not overlap with each other. Thus, part of one embodiment, or specific embodiments thereof, may or may not fall within the ambit of another, or specific embodiments thereof, and vice versa. Different embodiments from different aspects may be combined or practiced separately. Many different combinations and sub-combinations of the representative embodiments shown within the broad framework of this invention, that may be apparent to those skilled in the art but not explicitly shown or described, should not be construed as precluded.

Figure 2:
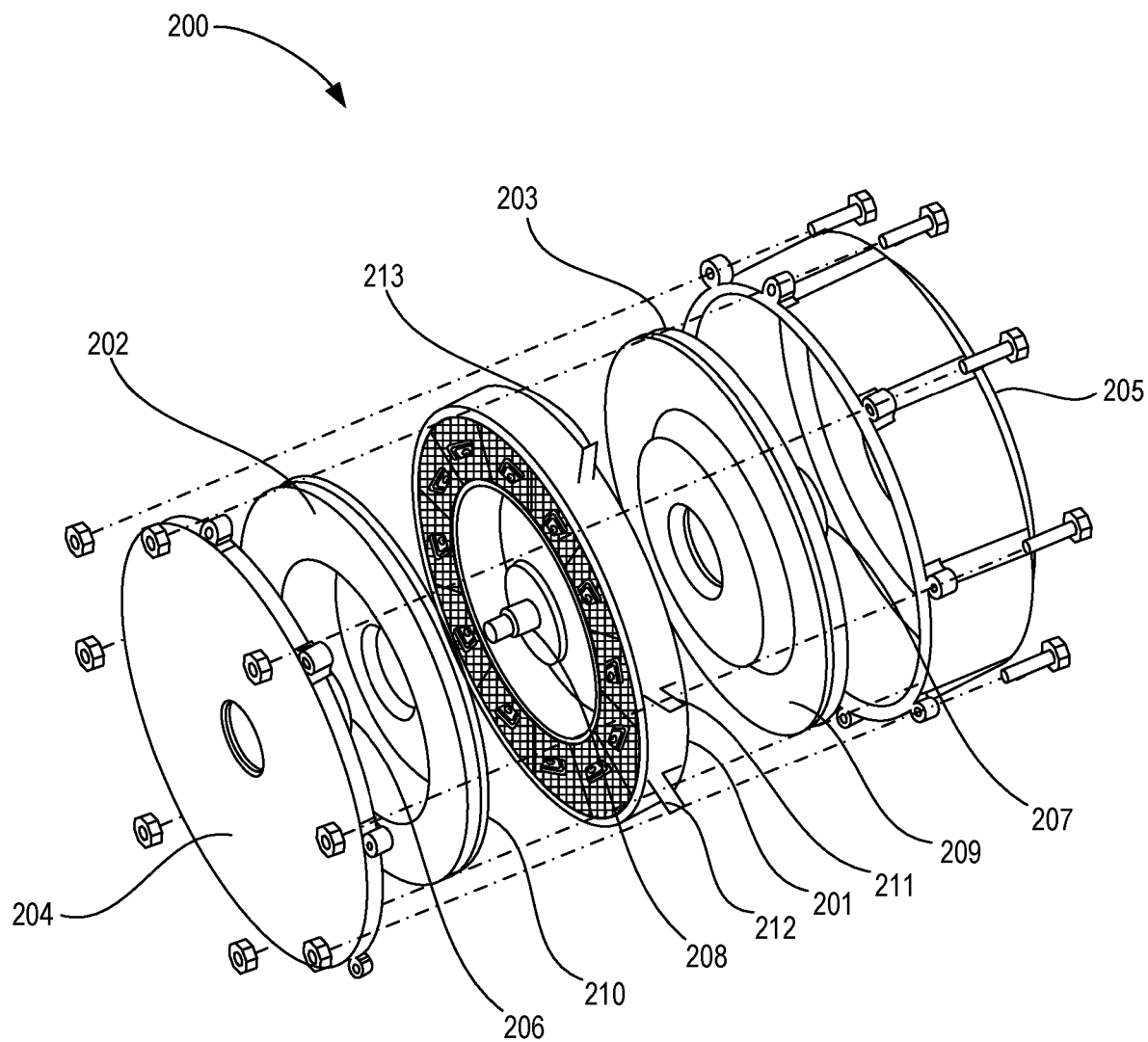
FIG. 2 illustrates an exploded view of an example of an axial flux electric machine in accordance with specific embodiments of the invention.

FIG. 2 illustrates an exploded view of an axial flux electric machine 200 (hereinafter, an axial flux electric machine is often referred to as a machine or an electric machine) in accordance with specific embodiments of the invention. The machine has one stator 201 and two rotors 202, 203, such that one rotor is on one side of the stator and the other rotor is on the opposite side of the stator. The stator and the rotors are axially positioned along an axis of rotation of the rotors. The rotors are adjacent to the stator but there is a gap between them. When assembled, the rotors are spaced apart from the stator in an axial direction of the axial flux electric machine 200 to form this gap. For example, the space between the stator and a rotor can be on the order of 0.1 millimeter to 3 millimeters. The machine includes an external support structure in the form of an external housing which comprises external housing parts 204, 205, a rotor shaft 208, and rotor support bearings 206, 207. When assembled, the rotor shaft is fixedly connected to each of the two rotors 202, 203. The bearings 206, 207 are in turn supported by the stator housing. The bearings 206, 207 allow rotation of the rotor shaft relative to the stator, which, as mentioned, is stationary. The stator comprises stator electrical contact terminals 211, 212, 213 for supplying current to the stator from an external power source. Each rotor 202, 203 comprises a permanent magnetic disc 209, 210 on the rotor's side that faces the stator 201.

In specific embodiments of the invention, the axial flux electric machine may include only one rotor and one stator. In other embodiments of the invention, the axial flux electric machine may include only one rotor and two stators, such that one stator is on one side of the rotor and the other stator is on the opposite side of the rotor. In alternative embodiments, the axial flux electric machine can include a larger number of rotors and stators which impart torque on a shared rotor shaft. In specific embodiments of the invention, two rotors that are driven by a single stator can distribute torque to two separate rotor shafts. In specific embodiments, two rotors that are driven by a single stator can be connected to a mechanical differential assembly such that they impart torque on a shared rotor shaft with two portions that can also be rotated independently of each other. In some embodiments, the rotor shaft is hollow.

Figure 3:
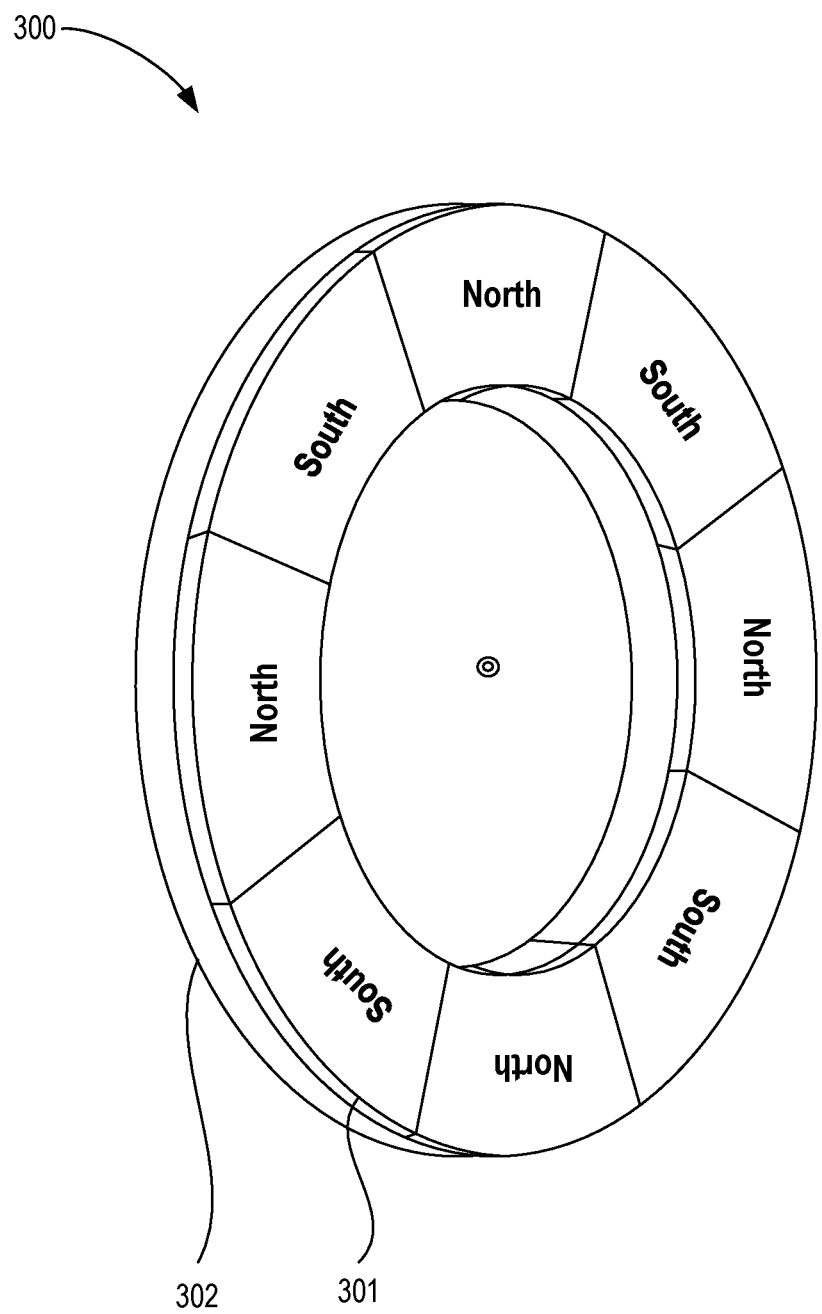
FIG. 3 illustrates an example of a rotor in accordance with specific embodiments of the invention.

FIG. 3 illustrates a rotor 300 in accordance with one embodiment of the invention. Permanent magnetic disc 301 is attached to rotor support structure 302, which provides mechanical support to the disc. Permanent magnetic disc 301 is magnetized in a way to create a substantially axial magnetic field with alternating north and south magnetic poles as shown in FIG. 3. In another embodiment, permanent magnetic disc 301 is achieved by joining a plurality of permanent magnets together or joining a plurality of permanent magnets to rotor support structure 302. In either embodiment, it is not necessary that the permanent magnets fill the entirety of the volume of permanent magnetic disc 301 as depicted in FIG. 3. Each rotor's rotor support structure is, in turn, attached to rotor shaft 208 in FIG. 2 in a way that allows for transmission of torque without relative movement at the contact surface between the rotor shaft and the rotor support structure and that all parts of the rotor spin at the same rotational velocity about the axis defined by the support bearings 206, 207, in FIG. 2.

Figure 4:
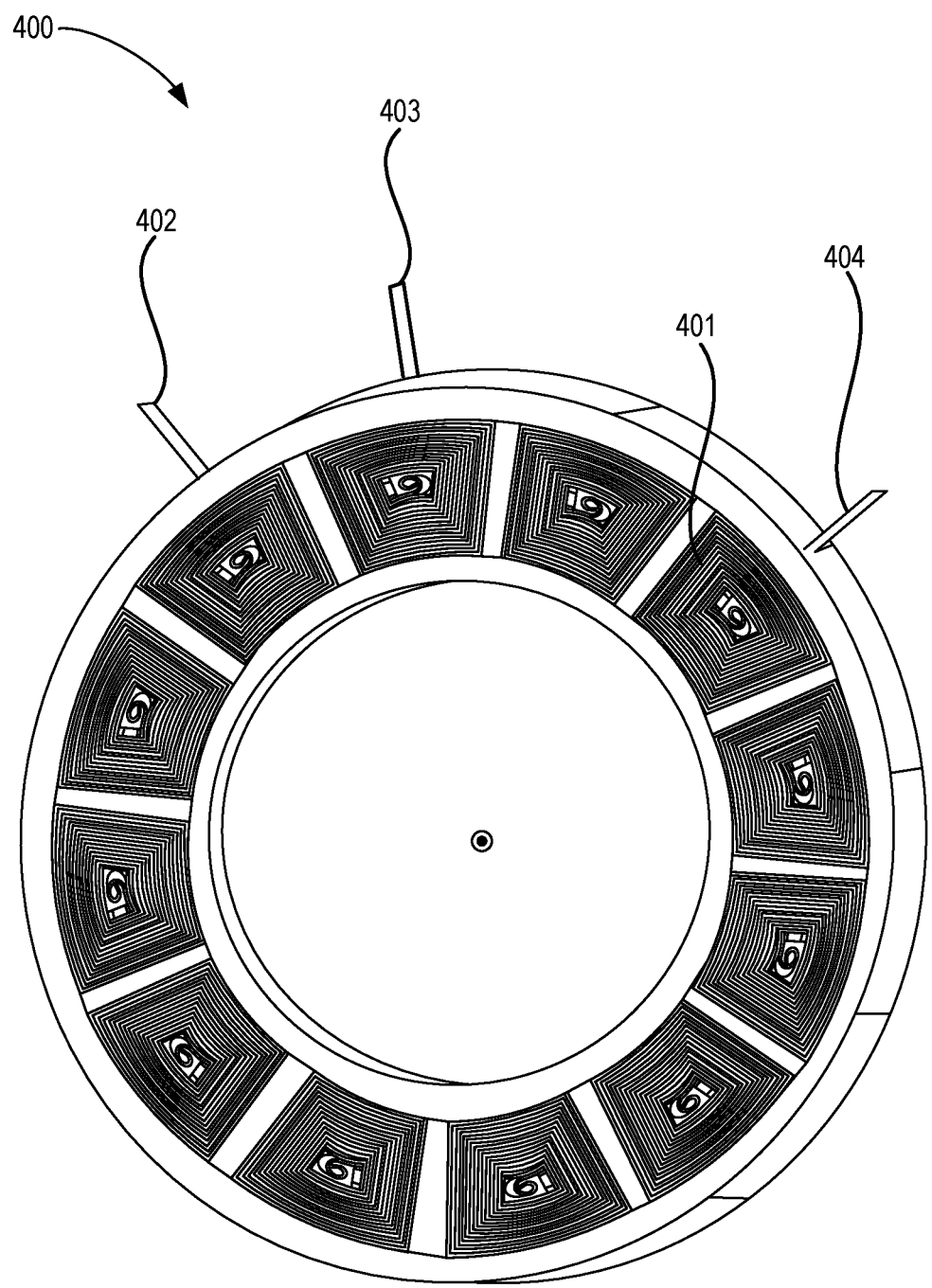
FIG. 4 illustrates an example of a stator in accordance with specific embodiments of the invention.

FIG. 4 illustrates a stator 400 in accordance with specific embodiments of the invention. Stator 400 includes a plurality of stator electrical contact terminals 402, 403, 404. The stator further comprises a plurality of pole pieces such as pole piece 401. In this example, each pole piece includes two interleaved composite material coils (in FIG. 4, only one interleaved composite material coil is shown). For each pole piece, the second interleaved composite material coil is adjacent to the illustrated interleaved composite material coil in the axial direction and is therefore hidden from view in FIG. 4.

In specific embodiments, each pole piece may include only one interleaved composite material coil or multiple interleaved composite material coils. As will be described below, in some embodiments, each pole piece may include multiple interleaved composite material coils including adjacent coils that are coiled in the same direction and that coil from the outside of the coil to the inside of the coil, and adjacent coils that are coiled in the same direction and that coil from the inside of the coil to the outside of the coil. As used herein, the term "direction" when used with reference to the direction of coiling can be either counter-clockwise or clockwise from a fixed plane of reference. As used herein, the term "inward" can refer to a coil which coils from the outside of the coil to the inside, and "outward" can refer to a coil which coils from the inside of the coil to the outside. Accordingly, the conductive ribbons and coiled interleaved composite material coils disclosed herein will each produce a magnetic flux that is in the axial direction of the axial flux electric machine and that is additive with other coils that are coiled in the same direction. Notably, an inwardly and counter-clockwise coiled ribbon will create the same magnetic flux as an outwardly and counter-clockwise coiled ribbon. As such, the interleaved composite material coil illustrated as part of pole piece 401 in FIG. 4, and the second interleaved composite material coil that forms part of pole piece 401 will both produce an additive magnetic flux in an axial direction relative to stator 400 because they are both coiled in the same direction.

Figure 5:
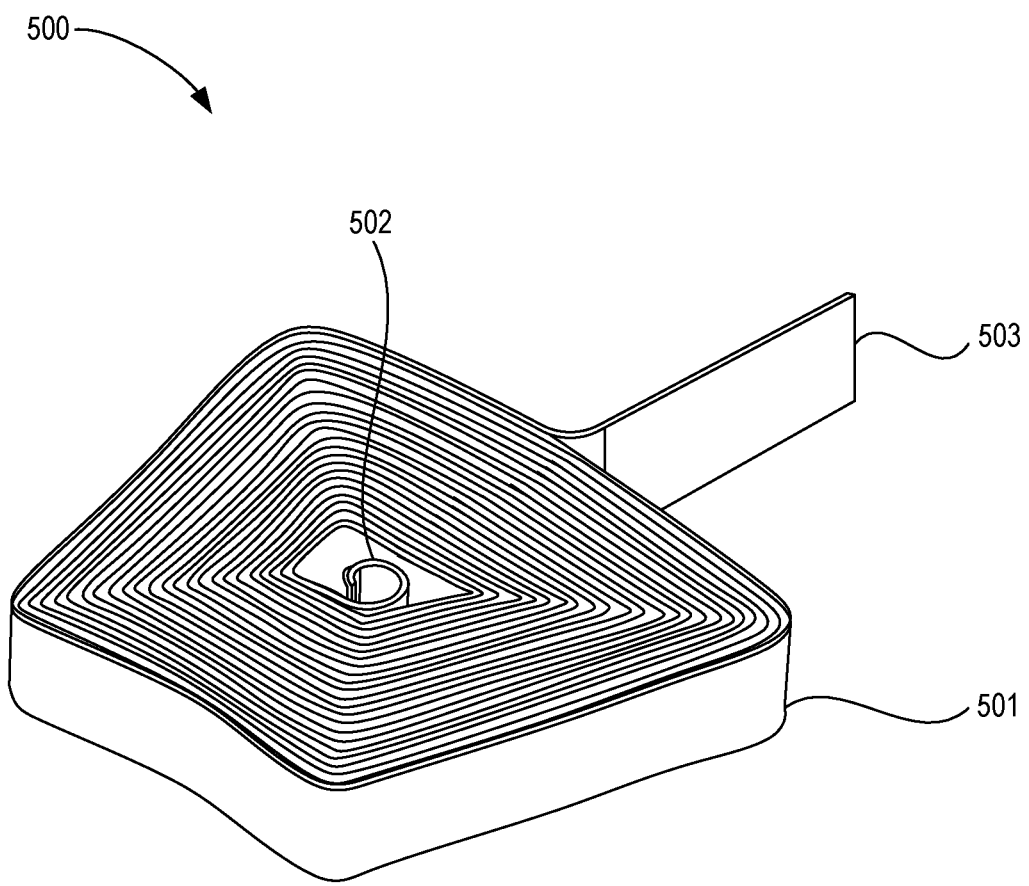
FIG. 5 illustrates an example of an interleaved composite material coil in accordance with specific embodiments of the invention.
Figure 6:
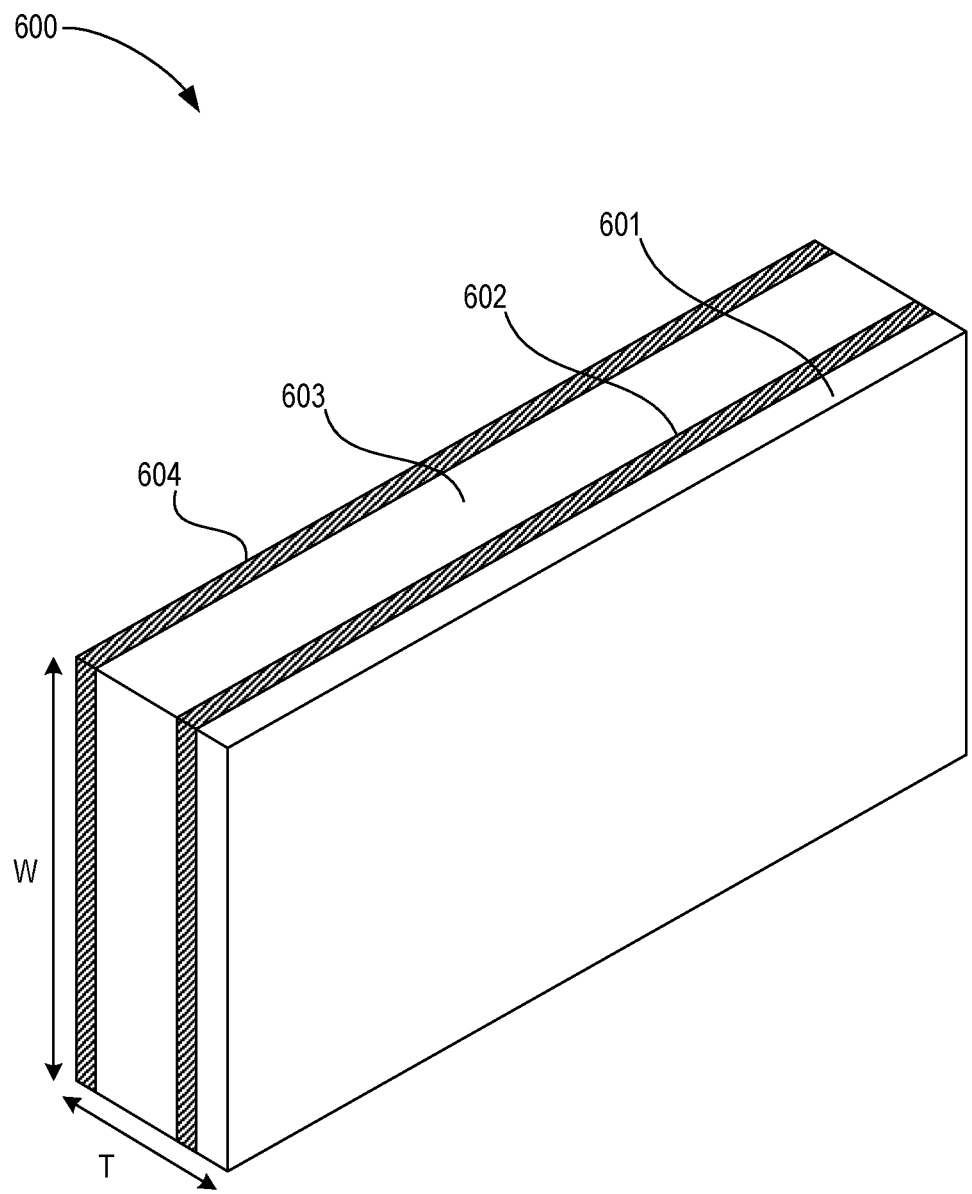
FIG. 6 illustrates an example of a piece of composite material ribbon in accordance with specific embodiments of the invention.

FIG. 5 illustrates an interleaved composite material coil 500 in accordance with specific embodiments of the invention. The interleaved composite material coil 500 is formed by coiling a composite material ribbon 501 inwardly and counterclockwise (i.e., counterclockwise from the outside of the coil to the inside of the coil). When installed, the interleaved composite material coil's axial direction will be substantially parallel to the axial direction of the axial flux electric machine. FIG. 6 illustrates a piece of composite material ribbon 600 in accordance with one embodiment of the invention. The composite material ribbon 600, in turn, is formed by interleaving, from the right to the left of FIG. 6, a ribbon of soft magnetic material 601, a ribbon of insulative material 602, a ribbon of conductive material 603, and a second ribbon of insulative material 604—such that on each side of the ribbon of conductive material there is one ribbon of insulative material. The material for the ribbon of soft magnetic material can be one of iron, silicon steel, magnetic cobalt alloy, amorphous steel, and any other suitable material. The material for the ribbon of conductive material can be one of copper, aluminum, and any other suitable material. Instead of separate ribbons of material, the insulative material could be a part of the ribbon of conductive material, part of the ribbon of soft magnetic material, or both. The insulative material could be part of the ribbon in that it sheathes at least a portion of the conductive material or the soft magnetic material. The sheathing could be partial because the ends of the ribbon will need to have ohmic connections to a bias voltage source. However, within the coil, all sides of the ribbon could be sheathed in insulative material. The cross section could appear the same as in FIG. 6, with an optional additional layer of insulative material along the illustrated exposed side of the ribbon of soft magnetic material 601.

As shown in FIG. 6, each ribbon of a particular material has two cross-sectional straight sides: W, the width of the ribbon as measured in an axial direction of the interleaved composite material coil 500, and T, the thickness of the ribbon as measured in a radial direction of the interleaved composite material coil 500. The composite material ribbon can include multiple ribbons of the same material. For example, two ribbons of conductive material can be pressed together in the composite material ribbon. This has the beneficial effect of doubling the thickness of the conductive material and thereby decreasing by half (assuming all other factors are constant) the ohmic resistance of the conductive material. This is particularly beneficial, because when, during operation, the interleaved composite material coil is energized, the pole of its magnetic flux alternates and the lower the resistance through the conductive material, the faster the pole changes. In this way, the thickness of the coiled ribbon of the conductive material, and therefore the performance of the axial flux electric machine, are easily adjustable: the larger the ribbon thickness, the lower the resistance, and the faster the pole switching rate. Conversely, the smaller the ribbon thickness, the higher the resistance, and the slower the pole switching rate. However, increasing the thickness of the coiled ribbon of the conductive material in this manner adds more weight to the machine and increases manufacturing cost. These principles also hold true for the width of the ribbon W. An appropriate design thickness of the ribbon can be determined as a trade-off among weight, manufacturing cost, and performance.

Figure 7:
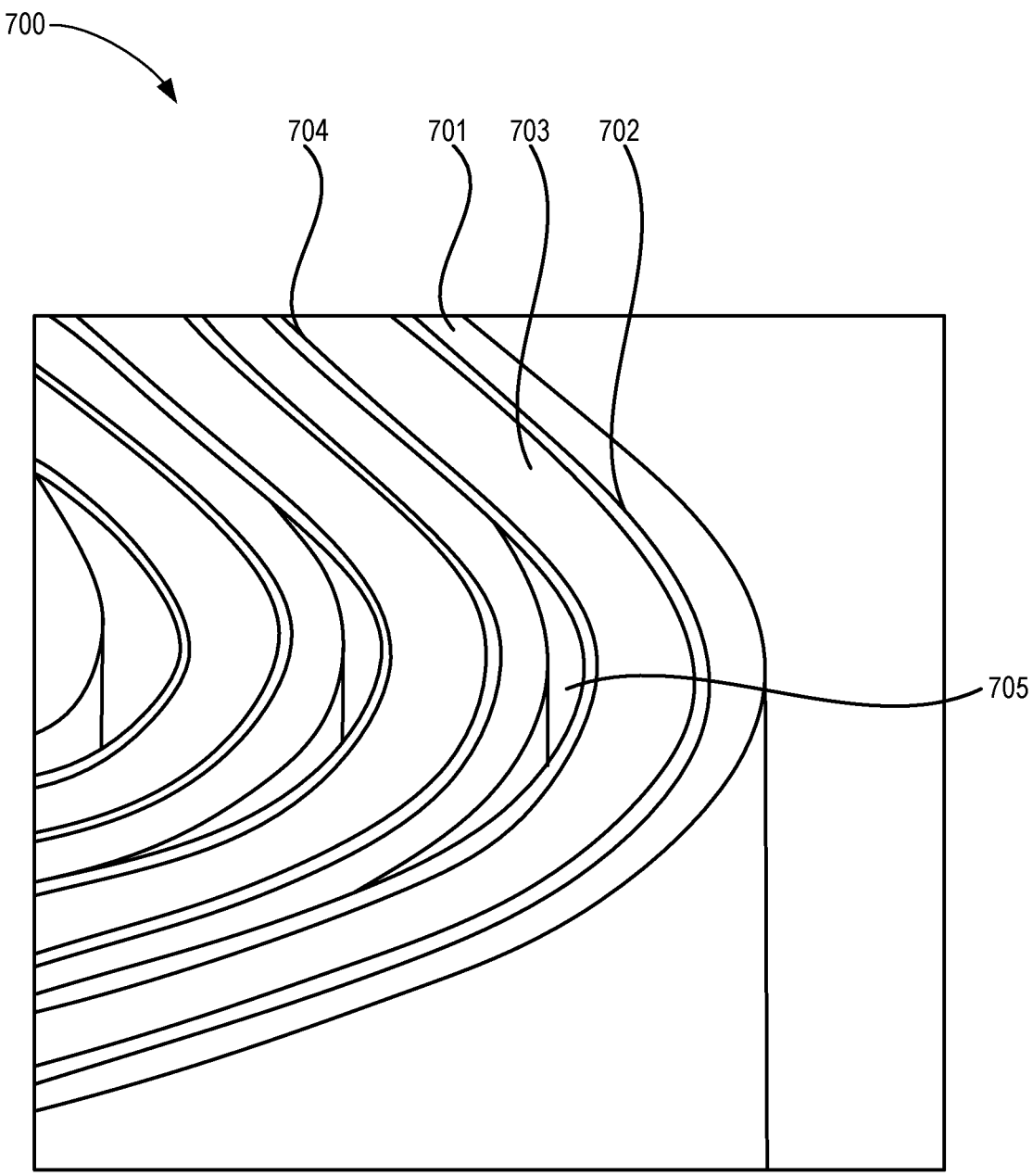
FIG. 7 illustrates a magnified view of an example of a turn corner of an interleaved composite material coil in accordance with specific embodiments of the invention.

FIG. 7 is a zoomed in view of a turn corner of an interleaved composite material coil in accordance with specific embodiments of the invention. Because the interleaved composite material coil is formed by coiling the composite material ribbon, the interleaved composite material coil comprises a coiled ribbon of soft magnetic material 701, a coiled ribbon of insulative material 702, a coiled ribbon of conductive material 703, and a second coiled ribbon of insulative material 704—each of which is commonly coiled in the interleaved composite material coil. The adjacent turns of the interleaved composite material coil are separated by an air gap 705. The ribbons thusly coiled can form part of pole piece 401 in FIG. 4.

In specific embodiments, the interleaved composite material coil 500 may not include any coiled ribbon of insulative material. For example, the ribbon of conductive material, and therefore, the coiled ribbon of conductive material, can be coated with an electrically insulating film or otherwise be sheathed in insulative material. Alternatively, the various ribbons in the interleaved composite material coil 500 can each be separated by an air gap instead of insulating material. In some embodiments, the composite material ribbon 600 may not include any ribbon of soft magnetic material and consequently, the interleaved composite material coil may not include any coiled ribbon of soft magnetic material. In specific embodiments, the coiled ribbon of conductive material and at least one other coiled ribbon of conductive material are pressed together and commonly coiled in a composite conductive coil; in such embodiments, the interleaved composite material coil comprises the composite conductive coil.

As, in specific embodiments, the interleaved composite material coil's axial direction is substantially parallel to the axial direction of the axial flux electric machine, each of the interleaved composite material coil's constituent coiled ribbons has an axial direction that is substantially parallel to the axial direction of the axial flux electric machine. Thus, for example, in the embodiment illustrated in FIG. 7, the axial direction of the coiled ribbon of conductive material 703 is substantially parallel to the axial direction of the axial flux electric machine. The coiled ribbon of conductive material forms a set of windings, and an air gap 705 separates adjacent windings in the set of windings. As seen, the coiled ribbon of conductive material forms at least two full concentric turns.

Figure 1:
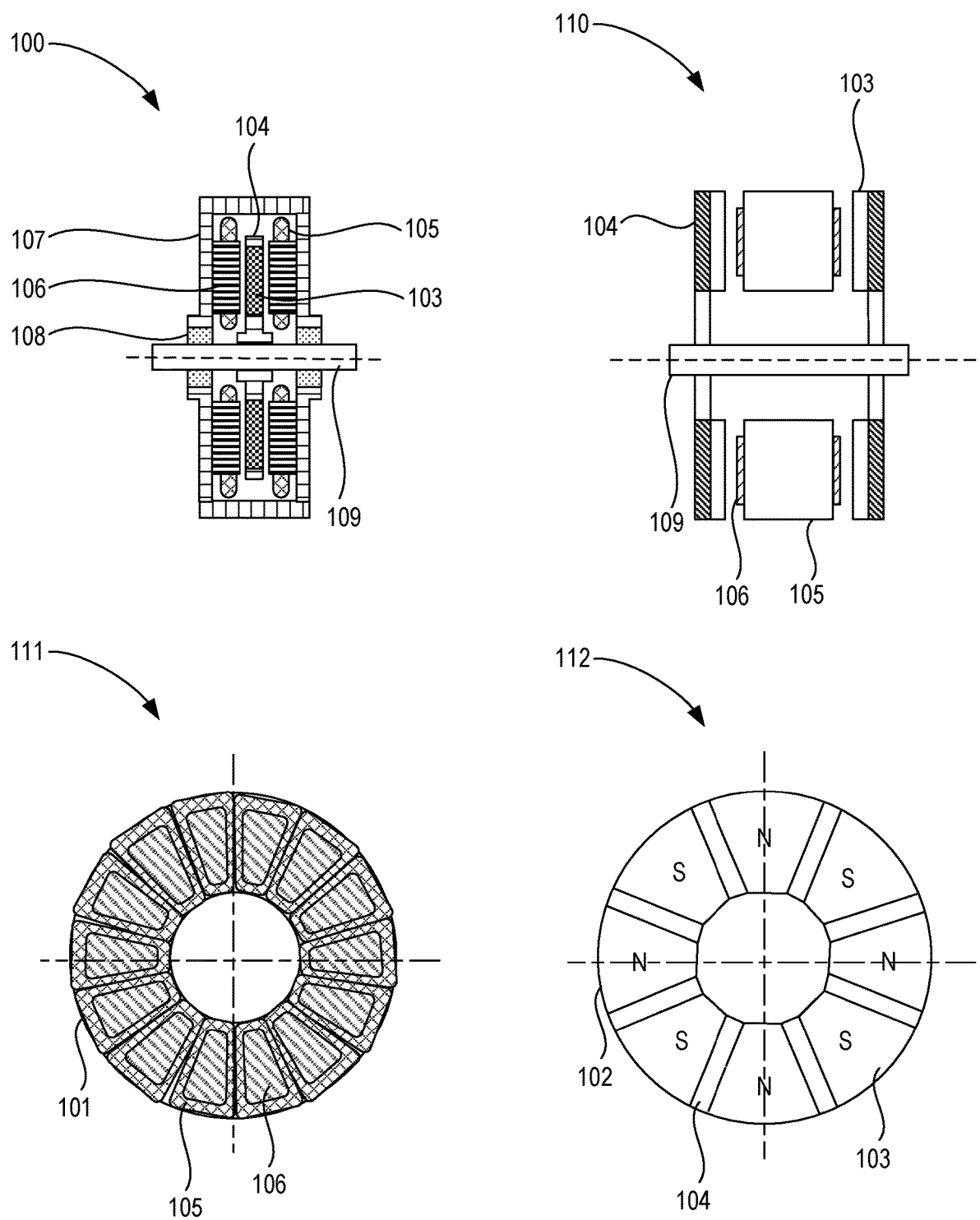
FIG. 1 illustrates axial flux electric machines in accordance with the related art.

In specific embodiments of the invention, the coiled ribbon of conductive material forms pole piece 401 in FIG. 4 in its entirety. This contrasts with related art axial flux electric machines discussed above in that a conductive material is not coiled around a central structure such as trapezoidal pole pieces 106 as shown in FIG. 1. In this way, the present invention does not require complicated manufacturing processes that accompany the construction of such central structures. Further, the ribbons of conductive material can be coiled into coils of any geometric shape, including, for example, rectangle, circular, triangular, pie, pentagonal, etc. This provides certain benefits in that the pole pieces can be shaped to fit different geometries as required by alternative design constraints for the axial flux electric machine. In specific embodiments, an outline of the coiled ribbon of conductive material forms a polygon as seen in FIG. 5.

Furthermore, using these approaches, the soft magnetic material, if present, can be distributed over the entire surface area of the pole piece as opposed to only being present in the center of the pole piece while leaving room for an outer winding as in pole piece 106 in FIG. 1. In specific embodiments, an annulus defined by an innermost turn of the coiled ribbon of conductive material and an outermost turn of the coiled ribbon of conductive material forms at least half of a surface area of the pole piece as measured in the radial direction of the axial flux electric machine. As such, the coiled ribbon of conductive material, and any soft magnetic material which is in the same interleaved composite material coil, can be distributed over the entire surface area of the pole piece. The fact that the soft magnetic material is distributed over a larger portion of the pole piece leads to an increase in the efficiency of the motor. In specific embodiments, the coiled ribbon of conductive material has a diameter of at least half of the surface area of the pole piece as measured in a radial direction of the coiled ribbon of conductive material. In specific embodiments, a radial surface area of the coiled ribbon of conductive material forms at least half of a radial surface area of the pole piece. FIG. 5 illustrates an interleaved composite material coil having a radial surface area that is the entire radial surface area of the pole piece because the entire pole piece is defined by the interleaved composite material coil.

In specific embodiments of the invention, the coil of conductive material forms the pole piece as a free-standing structure. In specific embodiments of the invention, the interleaved composite material coil forms the pole piece as a free-standing structure. As such, the pole pieces do not require a substrate in addition to the ribbons of material that form the pole pieces. For example, interleaved composite material coil 500 may serve as a free-standing structure in that the coiled ribbons are themselves the pole piece and they do not require a substrate for support. As a result, pole pieces formed in accordance with specific embodiments of the invention disclosed herein are not limited by compatibility with any substrate in terms of the type of materials that can be used to form the pole pieces. Additionally, the thickness and width of the ribbons are not constrained by compatibility with what a given substrate will support. This added degree of flexibility represents a significant improvement over approaches in the related art.

In reference to FIG. 5, the interleaved composite material coil 500, in accordance with specific embodiments, has two ends: an outer coil end on the periphery of the coil on its outermost turn and an inner coil end at the center of the coil on its innermost turn. The coiled ribbon of conductive material in the interleaved composite material coil presents an external electrical contact terminal 503 at the outer coil end and an internal electrical contact terminal 502 at the second end. The direction of the bend towards the external electrical contact would be in the opposite direction for a coil that was coiled counter-clockwise and outwardly from a center of the coil.

In specific embodiments, the coiled ribbon of conductive material includes at least two straight sides. For example, the interleaved composite material coil 500 in FIG. 5 includes a coiled ribbon of conductive material that has been shaped to have two straight sides where the straight sides are meant to engage with radial segments of a stator housing.

In specific embodiments, the ribbons disclosed herein can have various dimensions. For example, the coiled ribbon of conductive material may be less than 1 millimeter thick as measured in a radial direction of the coiled ribbon of conductive material. In some embodiments, the coiled ribbon of conductive material may be at least 1 millimeter wide as measured in an axial direction of the coiled ribbon. In specific embodiments, the dimensions of any coiled ribbon of soft magnetic material that is coiled with the coiled ribbon of conductive material can have comparable measurements. In some embodiments, the thickness of the coiled ribbon of soft magnetic material, as measured in a radial direction of the coiled ribbon of soft magnetic material, and the thickness of the coiled ribbon of conductive material, as measured in a radial direction of the coiled ribbon of conductive material, differ significantly. As mentioned previously, the dimensions of the ribbon can be increased to decrease the resistance of the ribbon and decreased to reduce the weight of the axial flux electric machine. Furthermore, the width of the conductive ribbons can be kept small to reduce the impact of eddy currents.

Figure 8:
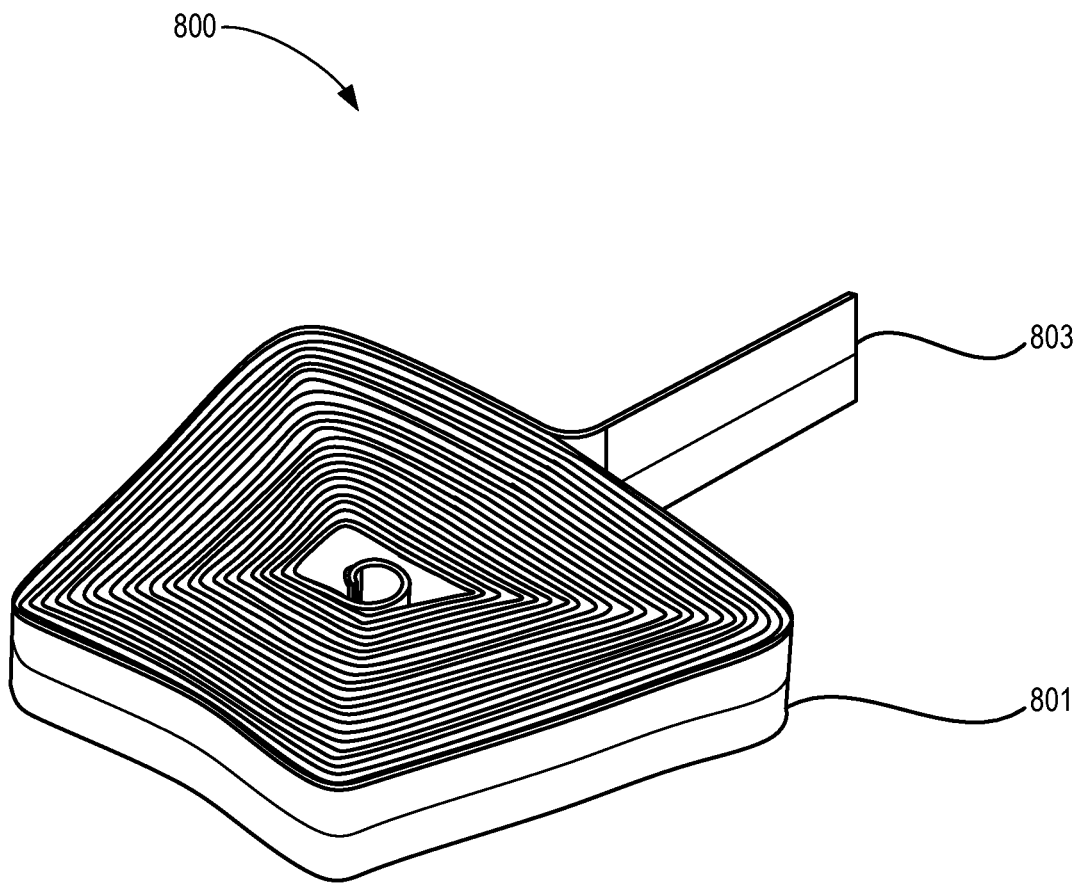
FIG. 8 illustrates a compound coil in accordance with specific embodiments of the invention.

FIG. 8 illustrates a compound interleaved composite material coil 800 which consists of an interleaved composite material coil 801 and a second interleaved composite material coil 802 that can be used to explain specific embodiments of the invention. The two illustrated interleaved composite material coils in FIG. 8 can have similar characteristics to that of interleaved composite material coil 500. For example, interleaved composite material coil 801 can include a coiled ribbon of conductive material and second interleaved composite material coil 803 can include a second coiled ribbon of conductive material. As illustrated, the coiled ribbon of conductive material that is part of interleaved composite material coil 801 is coiled in a first direction (i.e., counter-clockwise) and the second coiled ribbon of conductive material that is part of second interleaved composite material coil 803 is also coiled in the first direction (i.e., counter-clockwise). Furthermore, the second coiled ribbon of conductive material and the coiled ribbon of conductive material are adjacent in the axial direction of the axial flux electric machine. Owing to this configuration, the axial flux of each coiled ribbon of conductive material will be additive. Furthermore, the illustrated approach produces significant benefits in that the combined conductivity of the two coils will be equivalent, leading to higher switching speeds while at the same time the width of each individual ribbon has been cut in half compared to a single coil having the same conductivity. This is important because wider ribbons have been shown to produce eddy currents which tend to reduce the switching speed and efficiency of the pole piece. The number of separate coiled ribbons in a compound interleaved composite material coil as in FIG. 8 can be increased substantially above two to increase the benefit of this effect. At the same time, the ribbons can be adhered to adjacent ribbons using an insulative adherent in order for the compound coils to still maintain a structural cumulative width sufficient to serve as a freestanding structure. In the illustrated case, the second coiled ribbon of conductive material and the coiled ribbon of conductive material are each less than 5 centimeters wide as measured in an axial direction of the axial flux electric machine. In specific embodiments of the invention, the number of coiled ribbons of conductive material can be increased to the point where the coiled ribbons of conductive material are instead individual strands of conductive material in a Litz wire.

Figure 9:
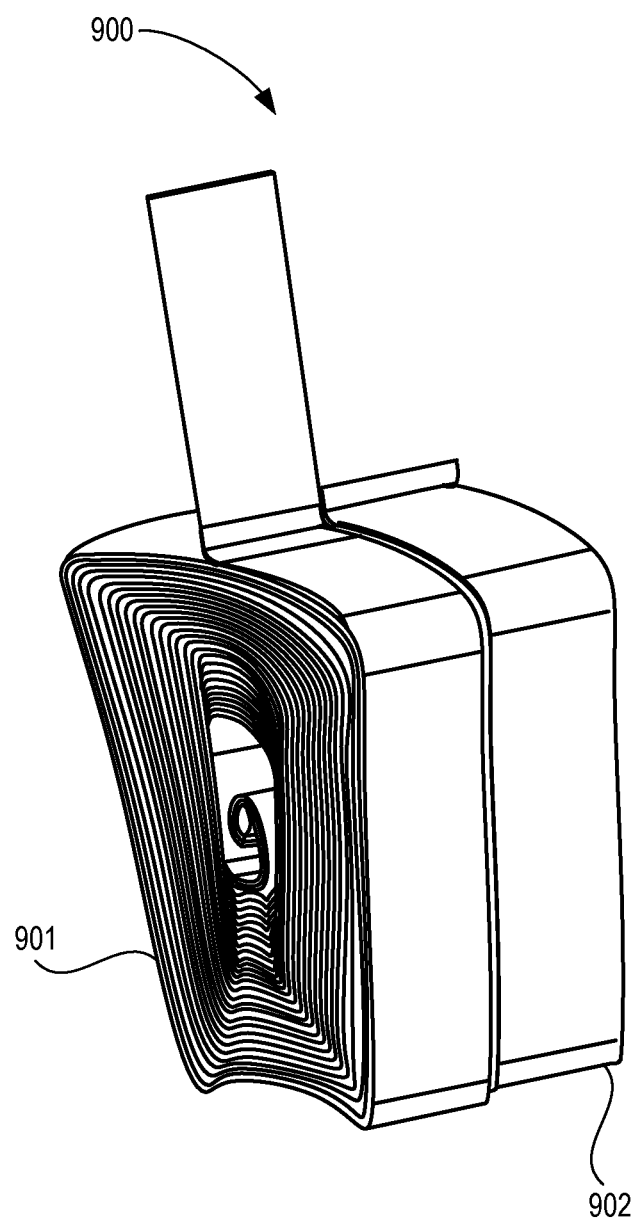
FIG. 9 illustrates an example of an assembled pole piece with a first interleaved composite material coil and a second interleaved composite material coil in accordance with specific embodiments of the invention.

FIG. 9 illustrates an example of an assembled pole piece 900 with a first interleaved composite material coil 901 and a second interleaved composite material coil 902 in accordance with specific embodiments of the invention. The interleaved composite material coils can include coiled ribbons of conductive material. In specific embodiments, each interleaved composite material coil has an external electrical contact terminal and an internal electrical contact terminal. The external electrical contact terminal can be a positive contact terminal or a negative contact terminal depending upon the configuration of the axial electrical machine. Furthermore, the interior electrical contact terminals of different interleaved composite material coils can be coupled together. In the particular configuration illustrated in FIG. 9, the interior electrical contacts of the two coils can be coupled together and one of the external electrical contact terminals can be a positive contact terminal while the other external electrical contact terminal is a negative contact terminal. As illustrated, first interleaved composite material coil 901 is coiled clockwise and inwardly and second interleaved composite material coil 902 is coiled clockwise and outwardly. Accordingly, the two adjacent coils can produce additive magnetic fluxes and also form a continuous electrical circuit from a positive contact terminal to a negative contact terminal with both terminals being located on an exterior of the stator in which assembled pole piece 900 will be installed.

Figure 10:
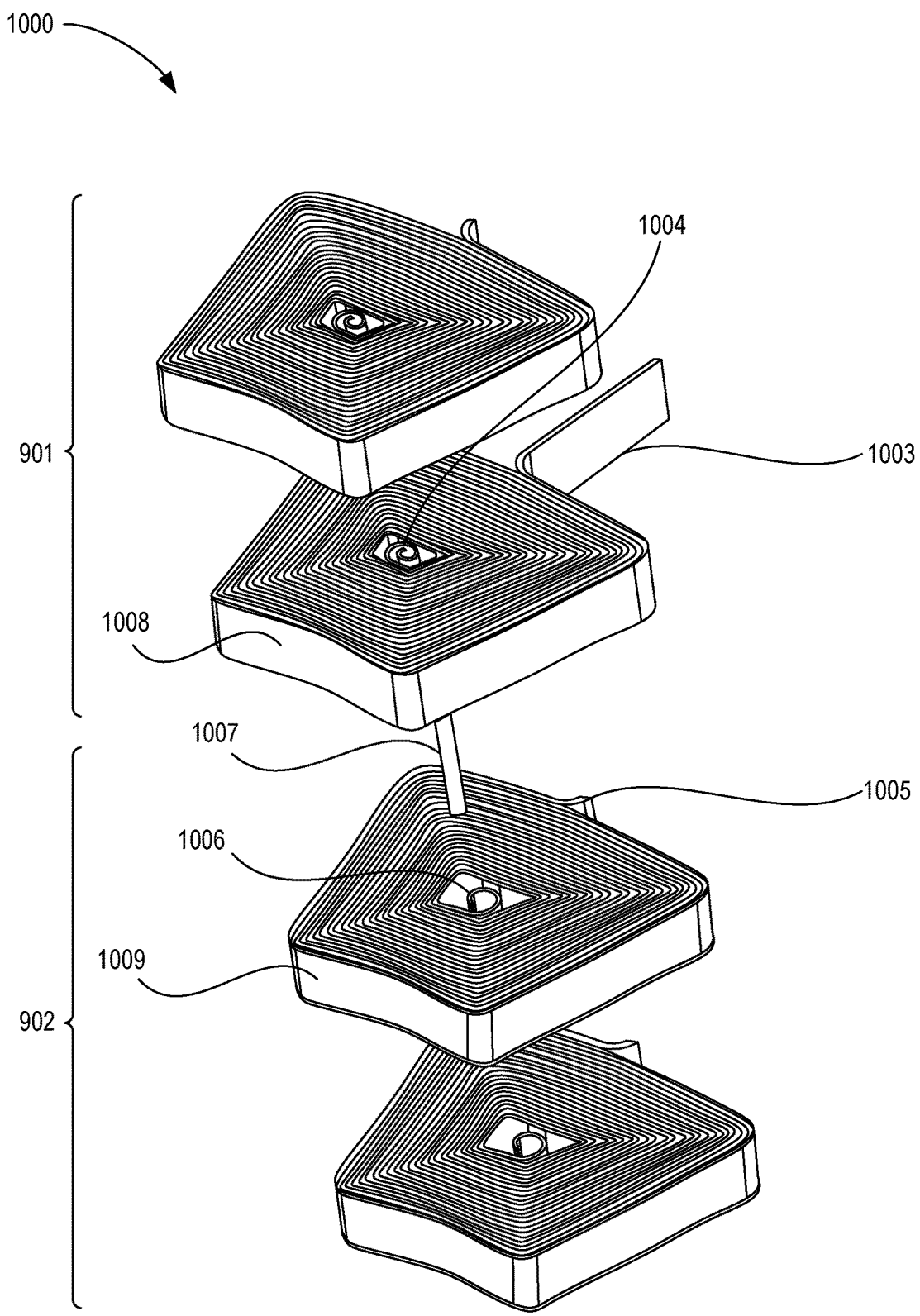
FIG. 10 illustrates an exploded view of the assembled pole piece in FIG. 9.

FIG. 10 illustrates an exploded view 1000 of the assembled pole piece 900. The exploded view shows two interleaved composite material coils with each of those composite material coils broken up into the two main coils of material that make up the composite material coils for a total of four coils. The first interleaved composite material coil 1001 has an external electrical contact terminal 1003 and an internal electrical contact terminal 1004 on the coiled ribbon of conductive material that is a part of that composite material coil. The second interleaved composite material coil 1002 has an external electrical contact terminal 1005 and an internal electrical contact terminal 1006 on the coiled ribbon of conductive material that is a part of that composite material coil. The internal electrical contact terminal 1004 and the internal electrical contact terminal 1006 are each electrically connected to an electrically conductive pin 1007. The conductive pin 1007 contacts an innermost turn of the coiled ribbon and an innermost turn of the second coiled ribbon and forms a part of the conductive path between the two external contact terminals. In this way, the external electrical contact terminal 1003 of the first interleaved composite material coil 1001 is ohmically connected to the external electrical contact terminal 1005 of the second interleaved composite material coil 1002, forming a conductive pathway between the two external electrical contact terminals.

The connection between separate coils of conductive materials that are spaced apart axially in the axial electrical machine can be provided in various ways. In the example of FIGS. 9 and 10, the connection is provided by a conductive pin. In other embodiments, the conductive pathway between the two external electrical contact terminals is formed differently. For example, in alternative embodiments, a single ribbon of conductive material can form both coils as a single piece. Accordingly, an interleaved composite material coil having such a single ribbon of conductive material can inwardly coil from a first external electrical contact terminal towards the center of the pole piece in a first plane, bend from a first plane in which the first coil is located into a second plane in which the second coil is located, and then outwardly coil from the center of the pole piece to a second external electrical contact terminal in the second plane. In other words, a coiled ribbon of conductive material that is in a first interleaved composite material coil (e.g., 1008) and a second coiled ribbon of conductive material that is in a second interleaved composite coil (e.g., 1009) can be part of a single continuous strip of conductive material. The single continuous strip of conductive material can be folded according to the process described below with reference to FIG. 11. Accordingly, in specific embodiments, the conductive path between axially spaced coils can include a fold in such a single continuous strip of conductive material that links the coiled ribbon of conductive material and the second coiled ribbon of conductive material.

Figure 11:
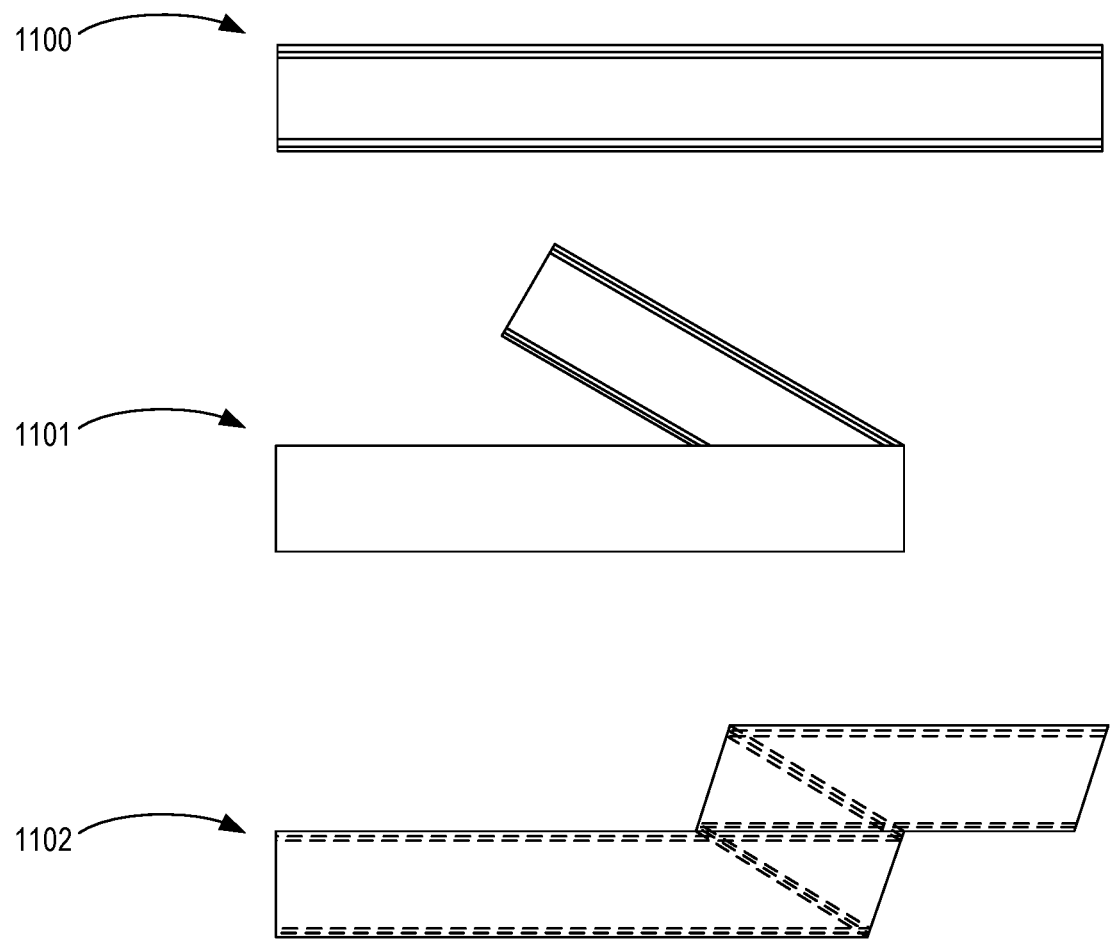
FIG. 11 illustrates a process for forming a fold in an interleaved composite material coil in accordance with specific embodiments of the invention.

FIG. 11 illustrates the process for forming an internal connection in the form of a fold in a single continuous strip of conductive material. In step 1100 the single continuous strip of conductive material can be provided. As shown, the strip of material can be folded over in step 1101 so that the folded portion forms the outline of a right-angle triangle with a top surface of the unfolded original strip of material. Next, the folded portion can then be folded again in step 1102 so that the strip of material is oriented in the same direction on either side of the fold. The position of the fold in step 1102 can be selected so that there is a sufficient offset between the plane occupied by the original unbent side of the strip of material and the bent side of the strip of material so that the two planes occupied thereby are sufficiently spaced for the coils of the pole piece to be formed. Since the strip of material is oriented in the same direction on either side of the fold, the coils formed on either side of the fold will be coiled in the same direction and their magnetic flux will be additive.

Figure 12:
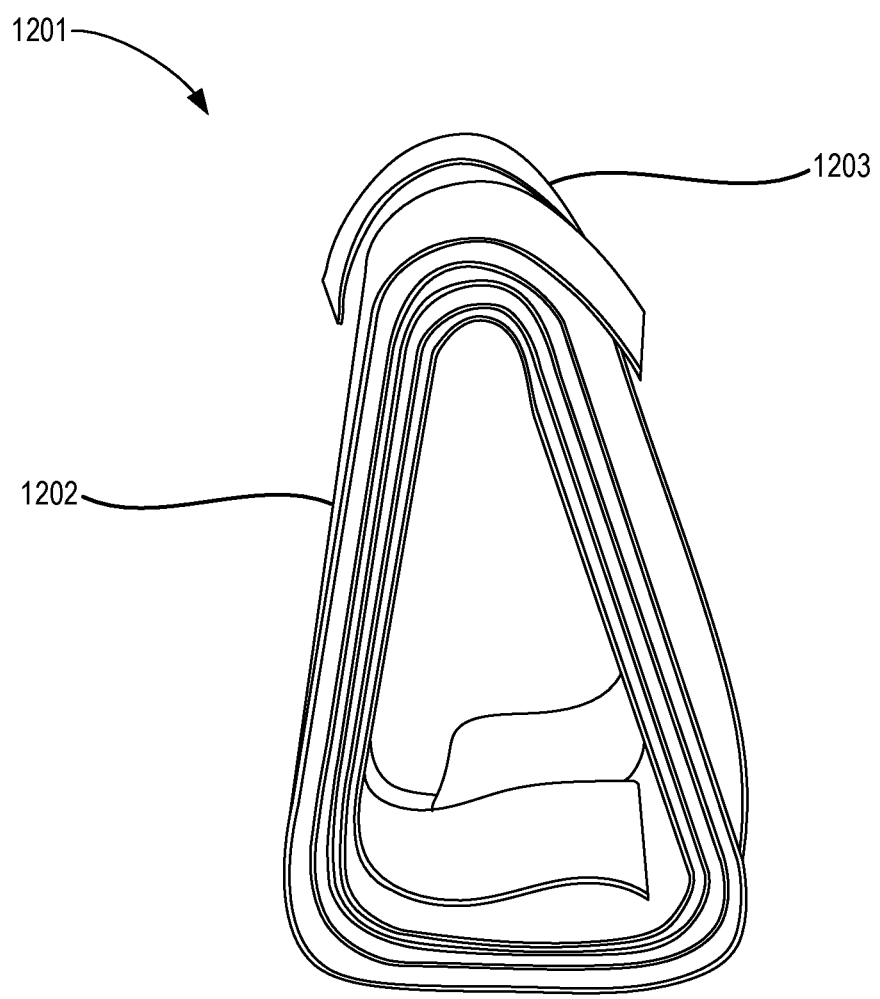
FIG. 12 illustrates a pole piece having a fold as an internal electrical connection in accordance with specific embodiments of the invention.

FIG. 12 illustrates a pole piece 1201 that has been formed using this approach illustrated in FIG. 11, two interleaved composite material coils have been formed by a single continuous strip of conductive material and a single continuous strip of soft magnetic material with both strips of material being folded according to the process in FIG. 11. As illustrated, the pole piece includes two external electrical contacts and the two coils are oriented such that their magnetic flux is additive (i.e., both coils are coiled counterclockwise with coil 1202 coiling inward and coil 1203 coiling outward).

Figure 13:
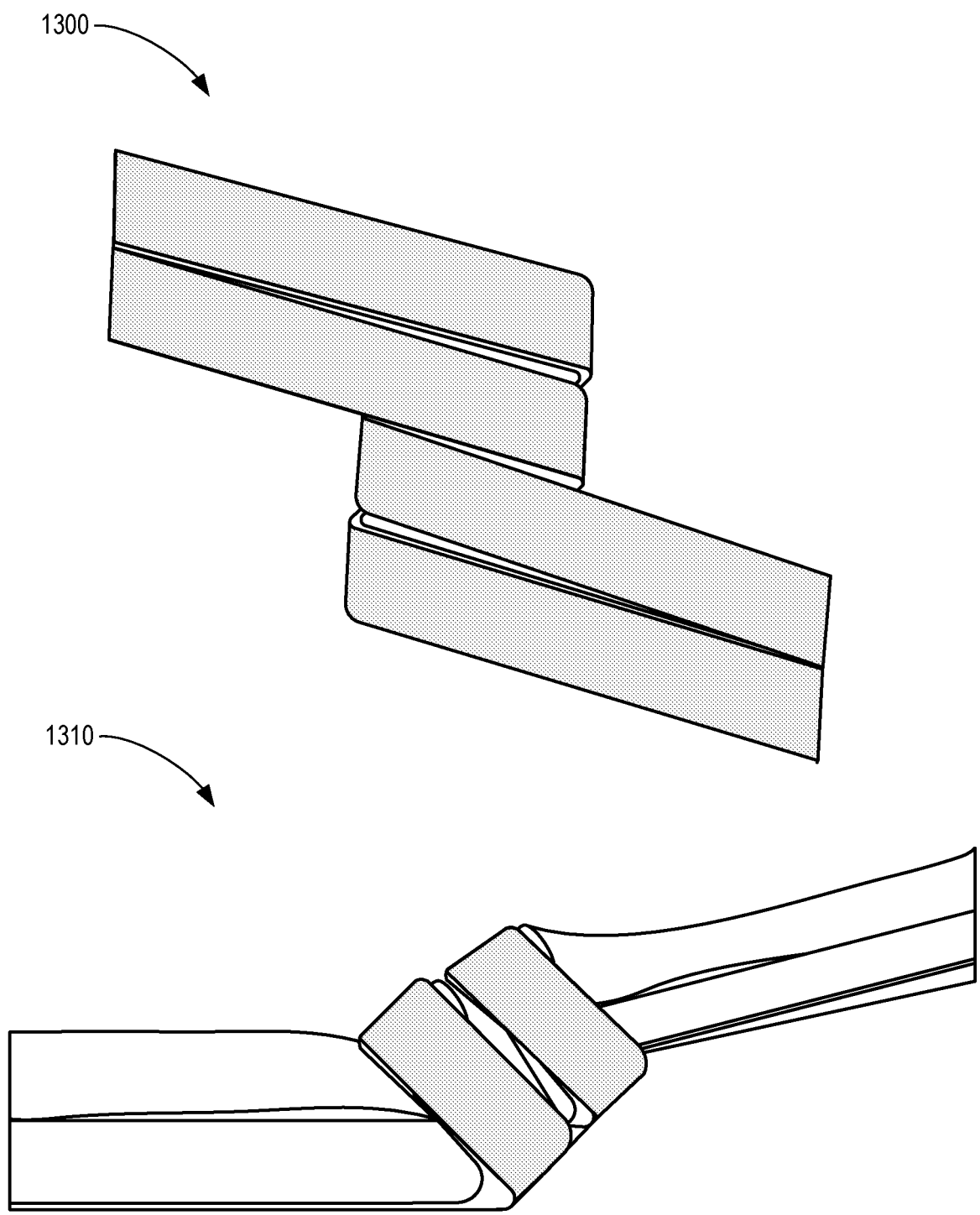
FIG. 13 illustrates a fold for a compound coil in accordance with specific embodiments of the invention.

FIG. 13 illustrates a fold pattern to allow a set of compound coils to utilize an internal electrical connection in the form of the folds described with reference to FIGS. 11 and 12. The compound coil can be the compound coil described with reference to FIG. 8 and it can include an internal connection in order to be connected to another compound coil where the two compound coils are oriented as the coils are with reference to FIGS. 9 and 10. View 1300 shows a top down view of the fold and view 1310 shows a bottom up view of the fold. As illustrated, two single ribbons of conductive material and two single ribbons of soft magnetic material are folded such that they can form a compound coil, transfer into a different plane, and then form a second compound coil. As the strips of material are oriented in the same direction on either side of the fold, both compound coils will coil in the same direction and can have additive magnetic flux. At the same time, one compound coil can coil inward and the other compound coil can coil outward such that a pole piece formed by the two compound coils can have two external electrical connections.

Figure 14:
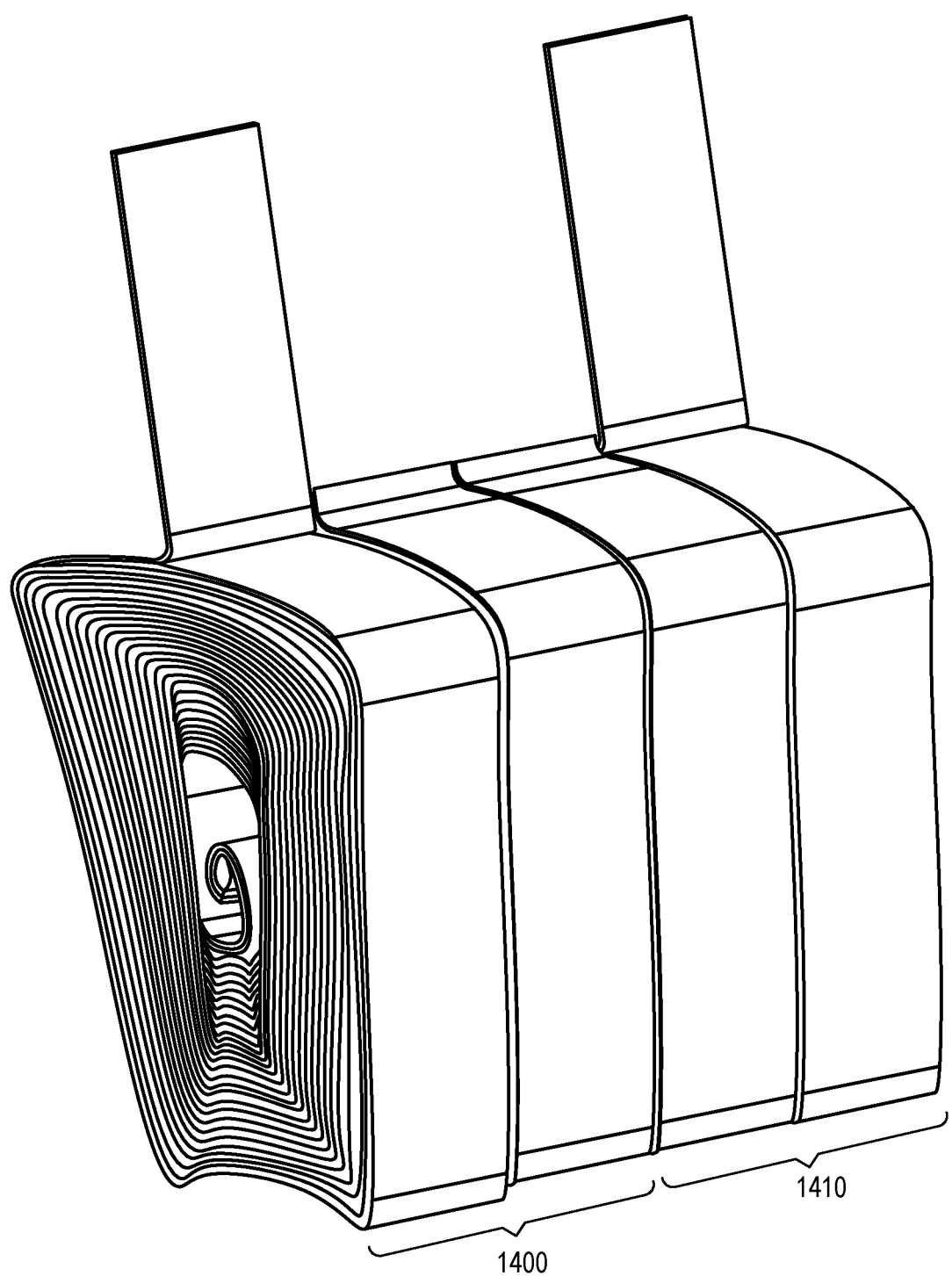
FIG. 14 illustrates a set of pairs of coils having additive magnetic flux and external electrical connections in accordance with specific embodiments of the invention.

FIG. 14 illustrates a set of pairs of coils that are arranged so that the coils all have additive magnetic fluxes and each pair of coils forms a single conductive pathway into the center of the coil and back out to the exterior of the coil to thereby present both a positive contact terminal and a negative contact terminal on an exterior of the coil. The set of pairs of coils could form a pole piece for an axial flux electric machine in accordance with this disclosure. While FIG. 14 includes two pairs of coils shown by pair 1400 and pair 1410, a set of pairs of coils in accordance with this disclosure could include any number of pairs of coils in the set so long as the illustrated pattern was continued. For example, the set of pairs that form a pole piece could include 2, 3, or 4 pairs of coils. The individual coils in the pairs could also be compound coils as described with reference to FIG. 8.

The pattern shown in FIG. 14 includes a coiled ribbon of conductive material coiled inwardly in a first direction and at least one additional coiled ribbon of conductive material coiled in the first direction (e.g., the outer coil of pair 1400 and the outer coil of pair 1410), and a second coiled ribbon of conductive material coiled in a second direction and at least one additional coiled ribbon of conductive material coiled in the second direction (e.g., the inner coil of pair 1400 and the inner coil of pair 1410), where the at least one additional coiled ribbon of conductive material coiled in the first direction and the at least one additional coiled ribbon of conductive material coiled in the second direction are arranged adjacently in the axial direction of the axial flux electric machine such that the magnetic fluxes of the coiled ribbon of conductive material, the second coiled ribbon of conductive material, the at least one additional coiled ribbon of conductive material coiled in the first direction, and the at least one additional coiled ribbon of conductive material coiled in the second direction are additive. Patterns in accordance with this disclosure can also be described with reference to the inward or outward coiling of the coils and the direction of the coils. In the pattern, each coil would coil in the same direction and A coils coil inwardly while B coils coil outwardly or vice versa. Accordingly, the pattern would be AB-BA-AB-BA with the pattern continuing as many times as needed to form a pole piece with the constraints of the overall axial machine in place such as minimizing the weight of the axial flux electric machine and other constraints.

In specific embodiments of the invention, an axial flux electric machine comprises a first pair of coiled ribbons of conductive material. For example, the coiled ribbon of conductive material and second coiled ribbon of conductive material described with reference to FIG. 9 can form the first pair of coiled ribbons of conductive material. The first pair of coiled ribbons of conductive material can be those of pair 1400. The axial flux electric machine can comprise at least one additional pair of coiled ribbons of conductive material, such as pair 1410, wherein the at least one additional pair of coiled ribbons of conductive material and the first pair of coiled ribbons of conductive material form a set of pairs of coiled ribbons of conductive material. As illustrated, every coiled ribbon of conductive material in the set of pairs of coiled ribbons of conductive material is coiled in a first direction, each pair of coiled ribbons of conductive material in the set of pairs of coiled ribbons of conductive material has an inwardly coiled coil and an outwardly coiled coil, and the set of pairs of coiled ribbons of conductive material are arranged adjacently in the axial direction of the axial flux electric machine so that an inwardly coiled coil of one pair is never adjacent to an outwardly coiled coil of another pair. Using this approach, the coils are all additive in terms of their magnetic flux, and each pair of coils provides two external electrical contacts. The pairs of coils can share a common conductive connection at their internal contacts such as a common conductive pin.

Figure 15:
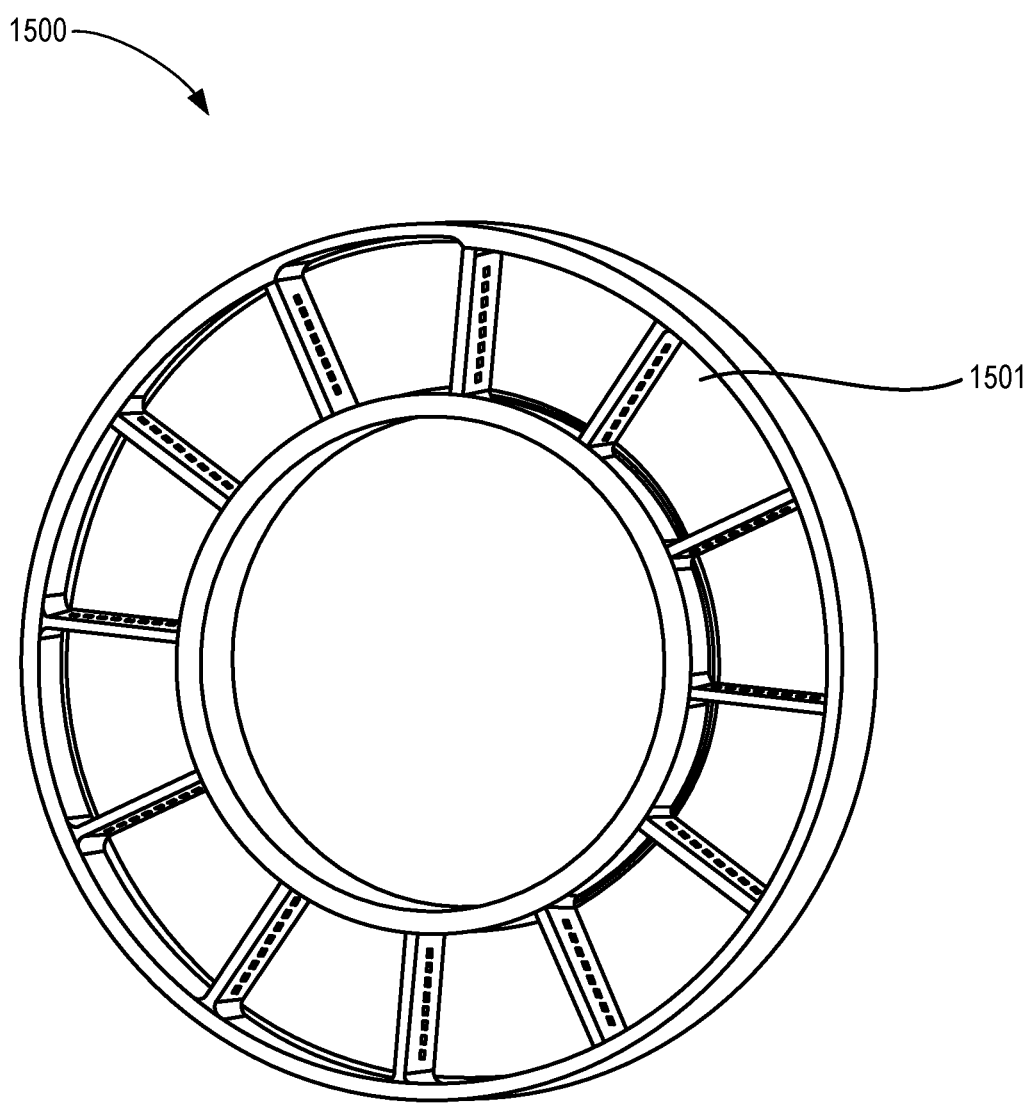
FIG. 15 illustrates an example of a stator housing in accordance with specific embodiments of the invention.
Figure 16:
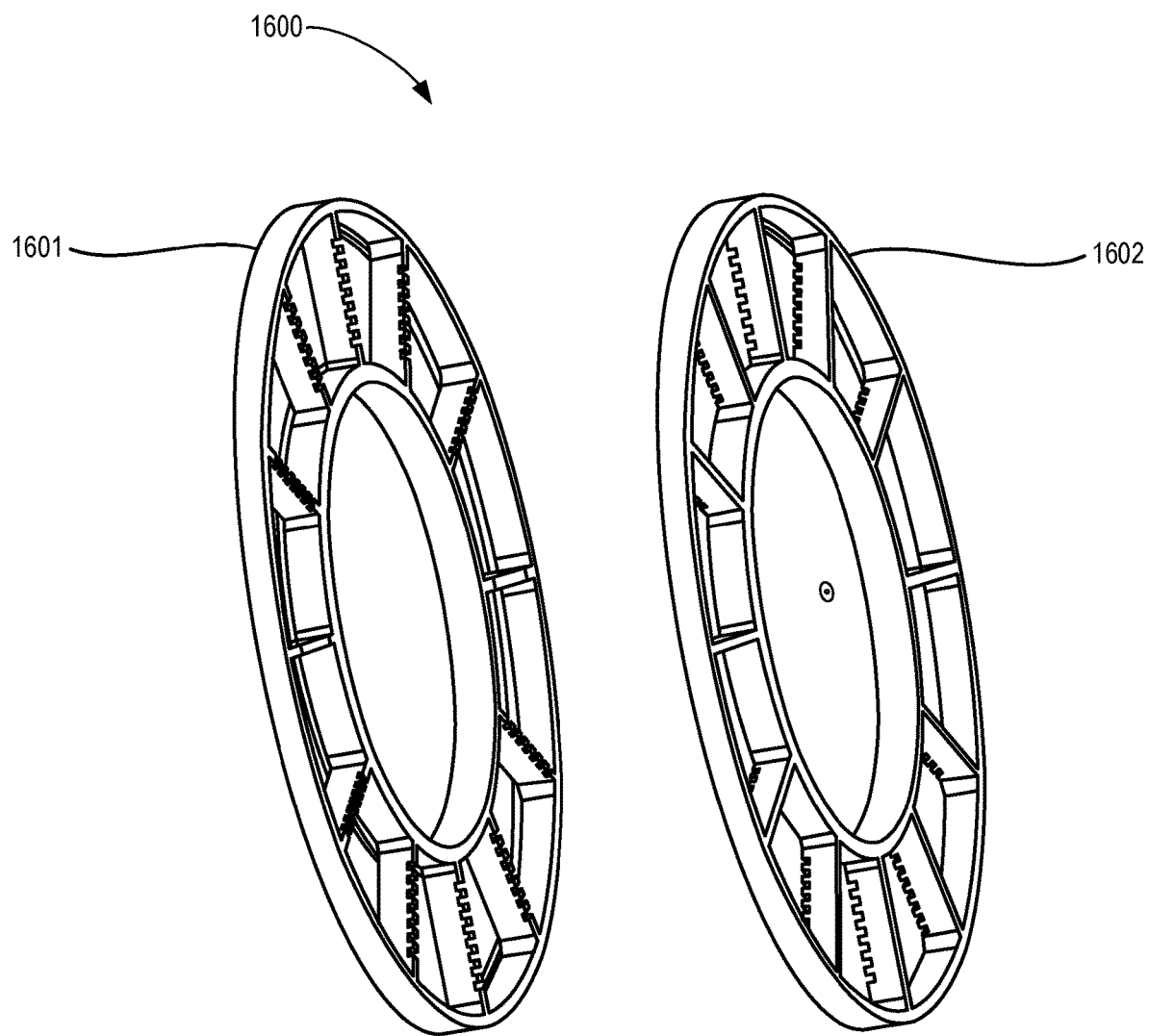
FIG. 16 illustrates another example of a stator housing in accordance with specific embodiments of the invention.

FIG. 15 illustrates an example of a stator housing 1500 for assembling and housing pole pieces within a stator in accordance with specific embodiments of the invention. The stator housing comprises a set of pole piece compartments 1501. The shape of the pole piece compartments in FIG. 15 is not a limitation of the embodiments of the invention disclosed herein. Indeed, a benefit of using specific embodiments of the invention disclosed herein is that the ribbons can be shaped to form pole pieces of highly variant sizes such that they can accommodate a diverse array of pole piece compartment designs. In other embodiments, a stator housing can be formed by joining together a first stator housing 1601 and a second stator housing 1602 as shown in FIG. 16. The stator housings may be manufactured using primarily metallic, polymer, or composite with separate parts that are mechanically joined together using one of known joining methods such as adhesion, fasteners, rivets, or other. Pole pieces are attached to the stator housing and fitted to pole piece compartments: one pole piece in one pole piece compartment. FIG. 4 illustrates a view of one side of the stator where pole pieces are thusly assembled. In specific embodiments, the stator housing is over-molded on the pole pieces.

As discussed in connection with FIG. 9, each assembled pole piece 900 comprises two interleaved composite material coils 901, 902. In specific embodiments, each pole piece is electrically connected to electrically conducting busbars not depicted in this figure through the two external electrical contact terminals 1003, 1005 of the pole piece. In this way, all pole pieces of that stator are connected through busbars. In turn, the busbars are electrically connected to the stator's electrical contact terminals 402, 403, 404. In some embodiments, some or all of the external electrical contact terminals of the pole pieces or the electrical contact terminals of the stator are positioned along the outer diameter of the stator. For example, in FIG. 4, the electrical contact terminals of the stator are positioned along the outer diameter of the stator. In some embodiments, some or all external electrical contact terminals of the pole pieces or the electrical contact terminals of the stator are positioned along the inner diameter of the stator.

In a pole piece assembled within the stator as discussed above, the pole piece's first interleaved composite material coil 901 and second interleaved composite material coil 902 are separated by a small gap that ensures the electrically conductive coils maintain a minimum distance to avoid any electrical breakdown of air due to electrical potential developed during operation. Alternatively, the gap is filled with a dielectric oil that enhances dielectric strength of the gap and allows for a narrower gap. Alternatively, a dielectric oil flows through the gap and allows for heat transfer from the coils to an external heat sink. This is achieved by connecting the oil flow path to a pump that maintains the flow of dielectric oil within the gap between the first interleaved composite material coil 901 and the second interleaved composite material coil 902.

Figure 17:
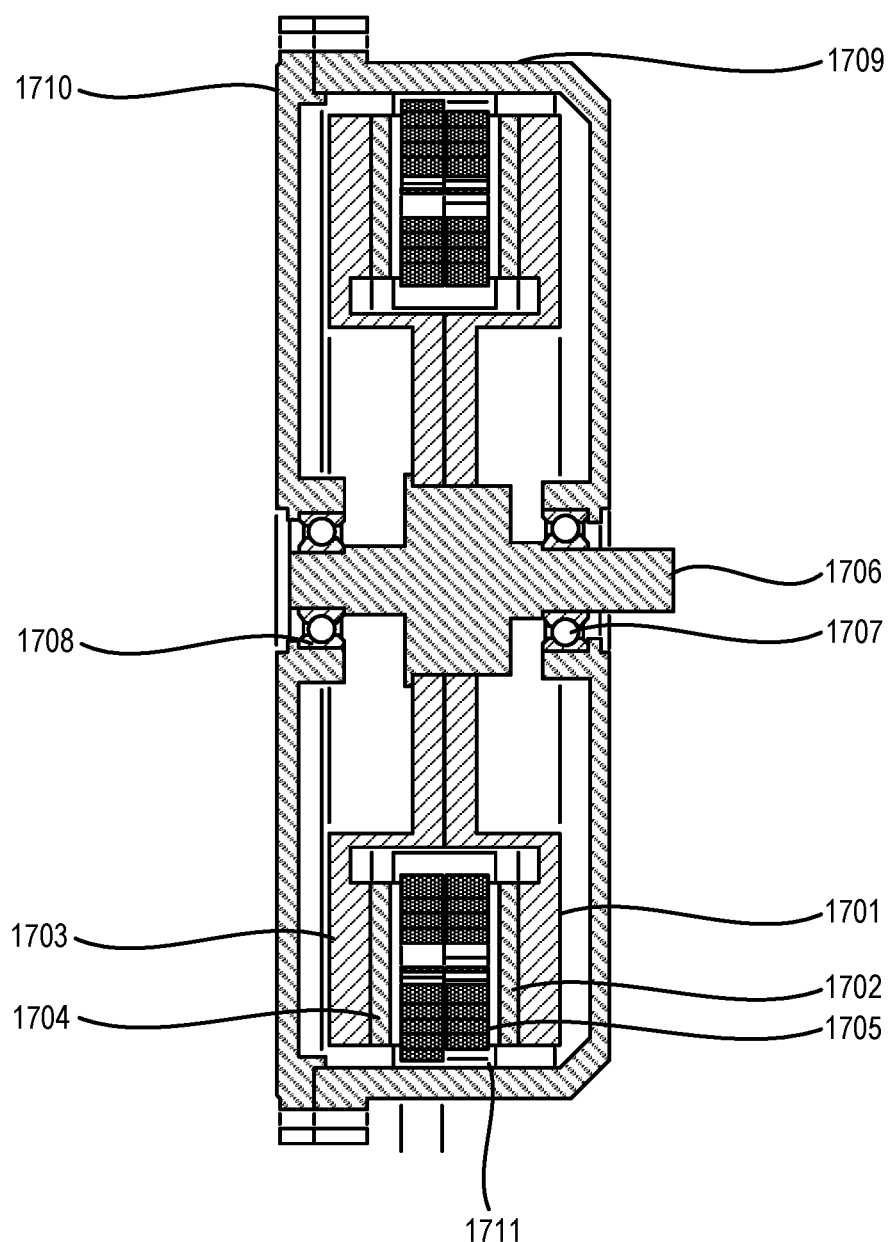
FIG. 17 illustrates a cross-sectional view of an example of an assembled axial flux electric machine in accordance with specific embodiments of the invention.

FIG. 17 illustrates a cross-sectional view of the axial flux electric machine of FIG. 2 where various components of the machine as described above have been assembled. FIG. 17 shows rotor support structure 1701 and permanent magnet disc 1702 of a first portion of a rotor on one side of the stator, rotor support structure 1703 and permanent magnet disc 1704 of a second portion of a rotor on the other side of the stator opposite to the first portion of the rotor, a pole piece 1705, a rotor shaft 1706, rotor support bearings 1707, 1708, and an external housing comprising external housing parts 1709, 1710. The stator is secured to the housing via stator support structure 1711. The portions of the axial flux electric machine above the rotor shaft 1706 with similar shading are alternative parts of the same circular components.

Figure 18:
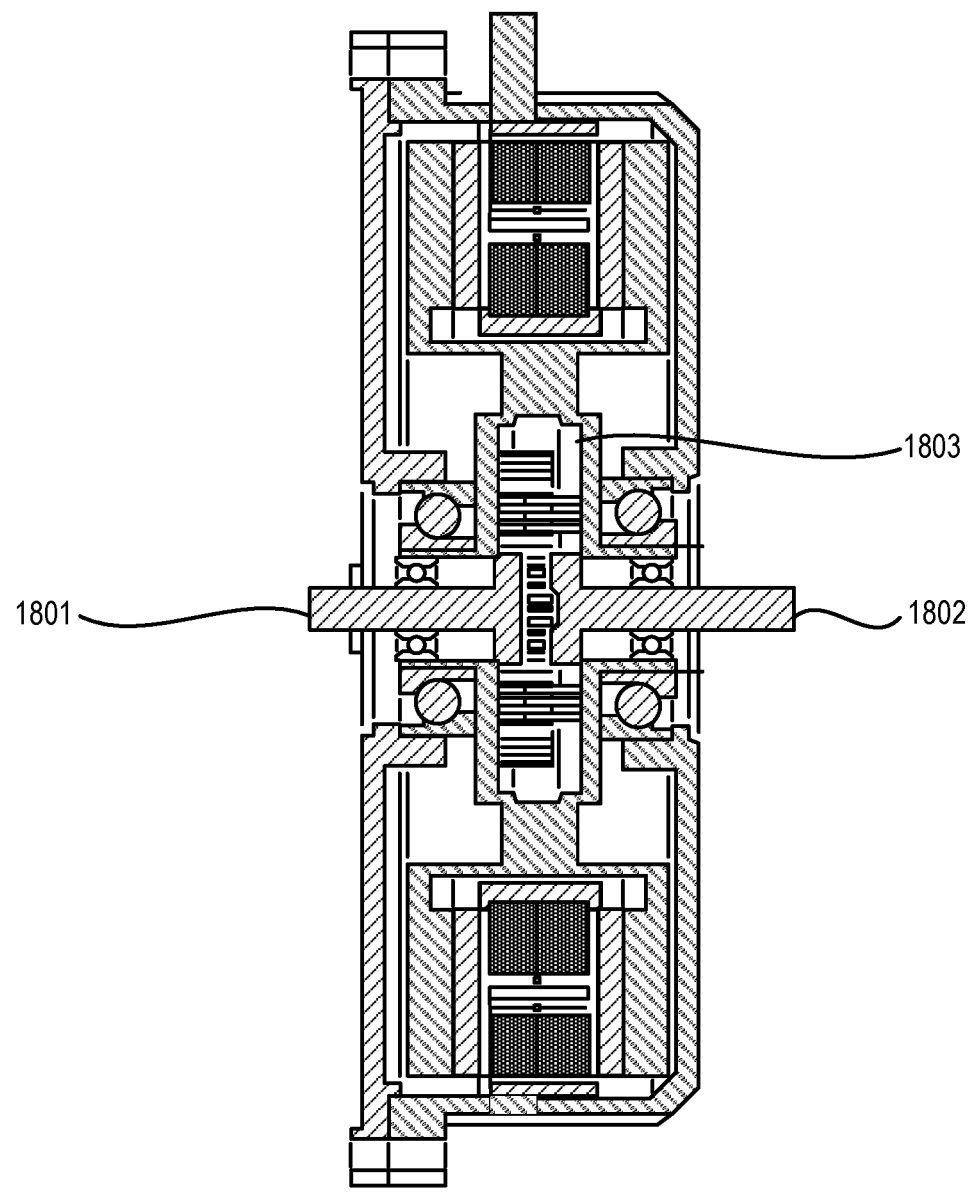
FIG. 18 illustrates a cross-sectional view of an example of an assembled axial flux electric machine with a mechanical differential assembly in accordance with specific embodiments of the invention.
Figure 19:
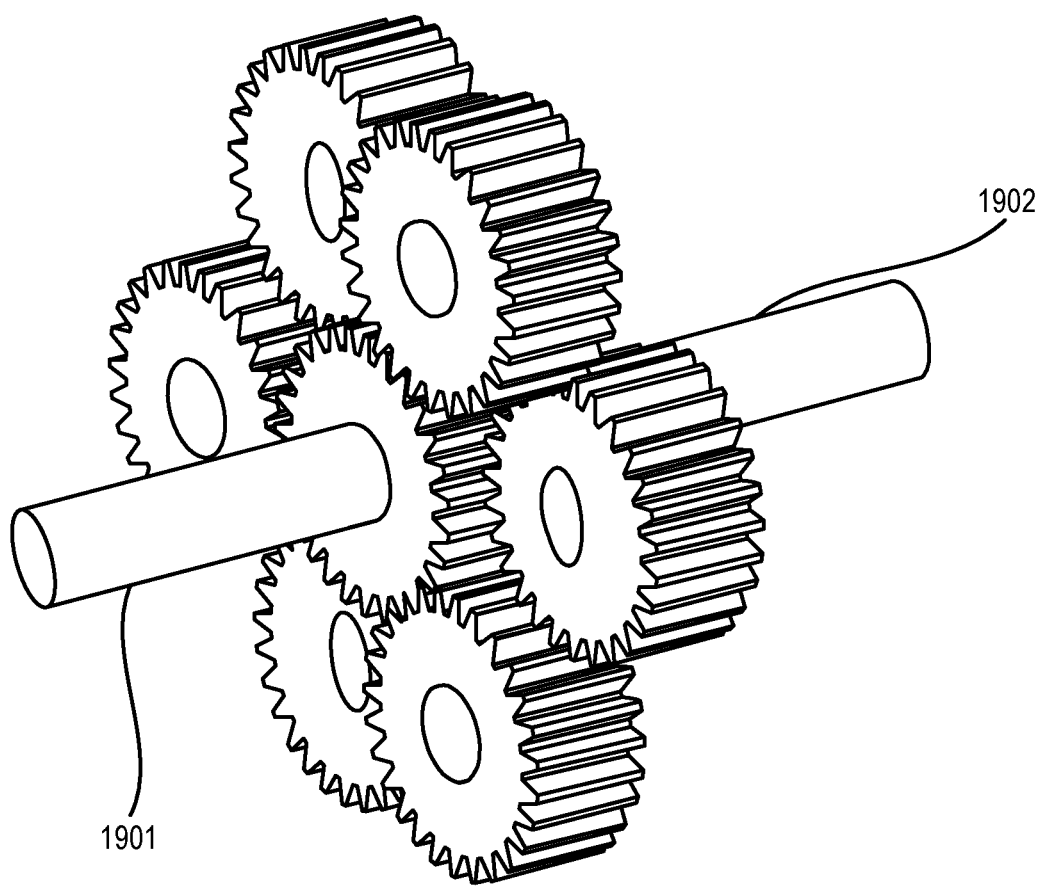
FIG. 19 illustrates an example of gears of the mechanical differential assembly in accordance with specific embodiments of the invention.
Figure 20:
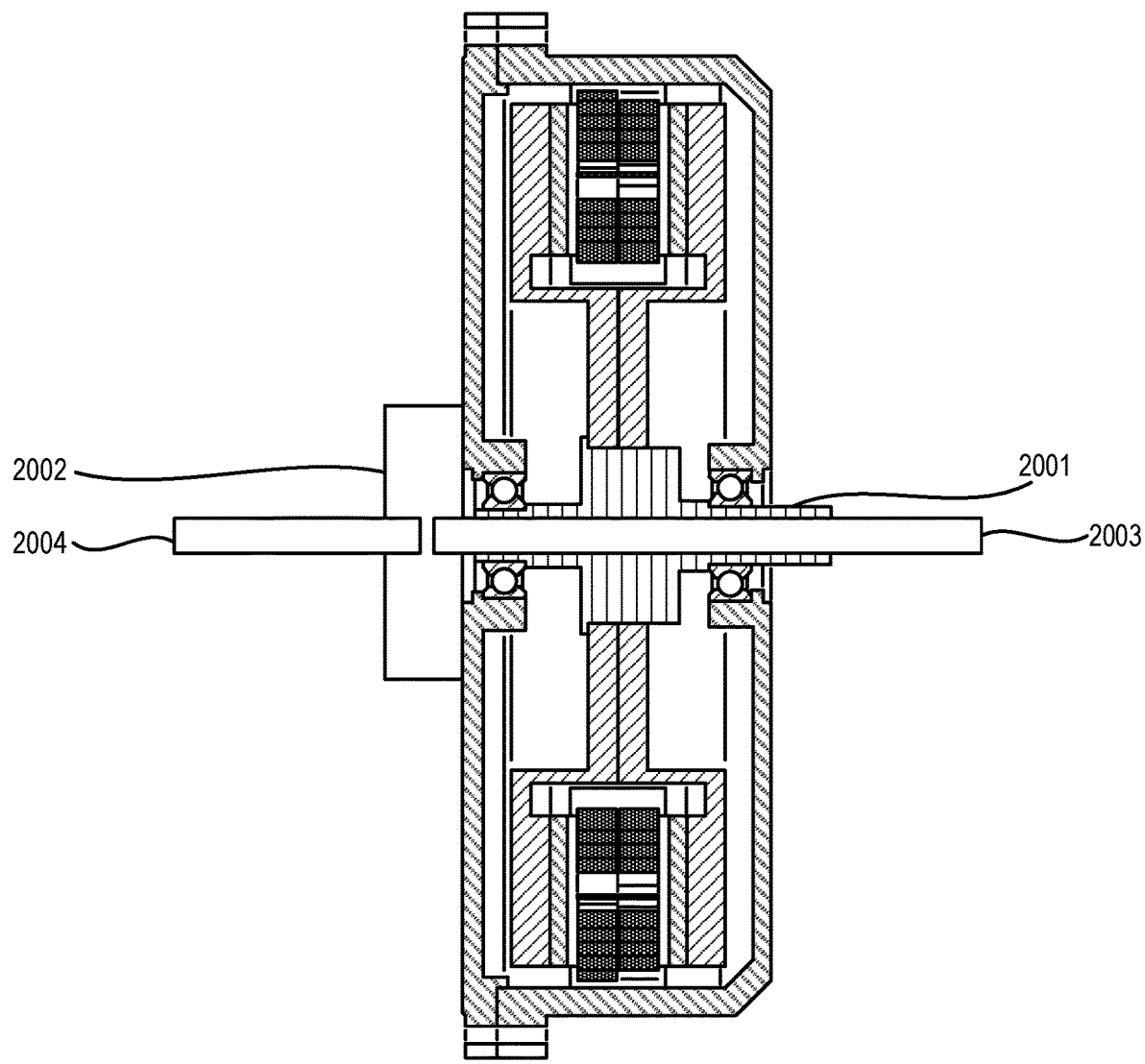
FIG. 20 illustrates an example of a mechanical differential assembly in accordance with specific embodiments of the invention.

FIG. 18 illustrates a cross-sectional view of a specific embodiment of the axial flux electric machine which comprises a first rotor shaft 1801, a second rotor shaft 1802, and a mechanical differential assembly 1803. The mechanical differential assembly transmits torque from the rotors to the rotor shafts and using gears, pinion gears, and other components, allows for a rotational difference between the two rotor shafts. The allowance for the rotational differences allow relative rotational motion of the two rotor shafts. FIG. 19 illustrates an example of gears of the mechanical differential assembly with the two shafts 1901, 1902 and the associated gears. In FIG. 18, the mechanical differential assembly 1803 is located inside the axial flux electric machine. In an alternative embodiment, the differential mechanical assembly can be located outside the machine. In such an embodiment, as illustrated in FIG. 20, the rotors are coupled to a main rotor shaft 2001 that is hollow, differential assembly 2002 is located immediately outside the axial flux electric machine, and one of the rotor shafts passes through the hollow main shaft from one side of the machine to the differential assembly located on the other side of the machine. The differential assembly 1502 transfers torque from the main rotor shaft to a first rotor shaft 1503, which passes through the hollow main shaft, and a second rotor shaft 1504, but using gears and pinion gears and other components, causes a rotational difference between the two rotor shafts.

Figure 21:
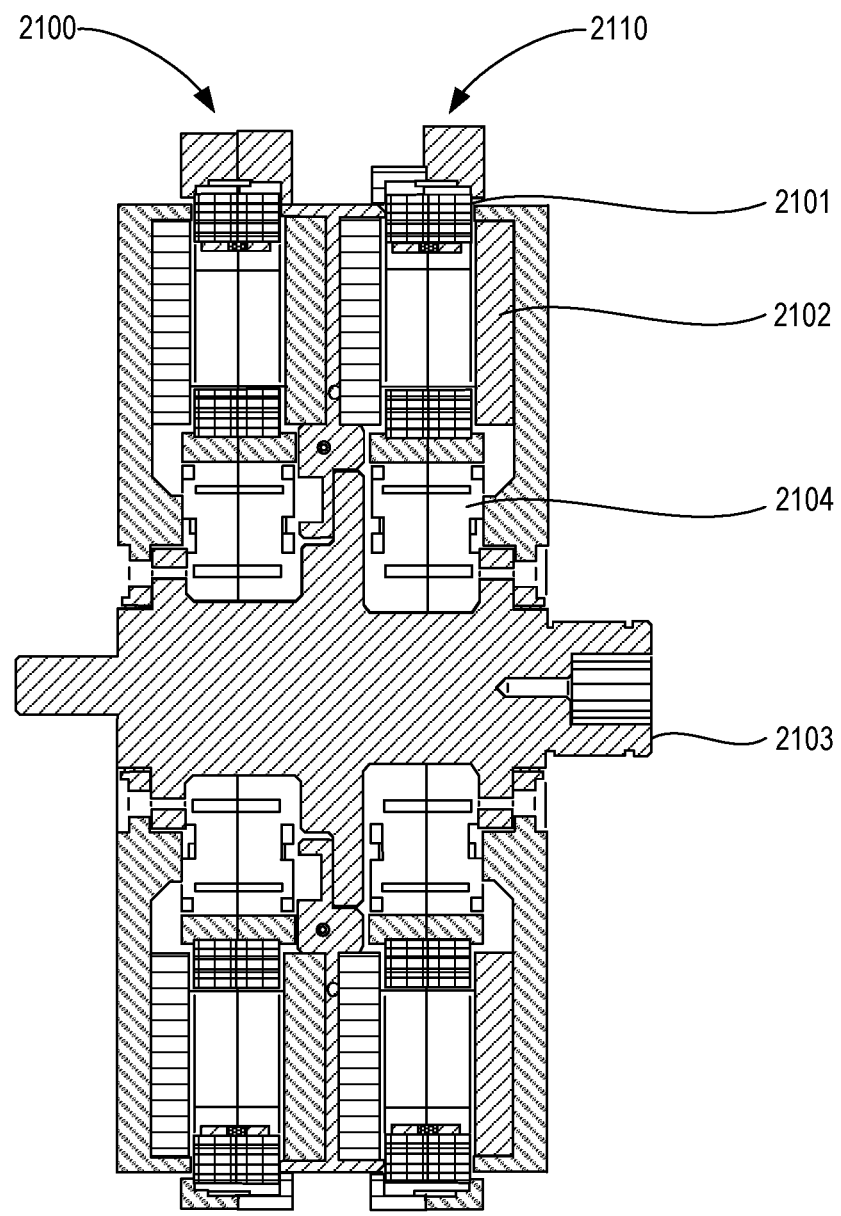
FIG. 21 illustrates an example of axially stacked axial flux electric machines in accordance with specific embodiments of the invention.

In specific embodiments of the invention, two or more axial flux electric machines as described above can be axially stacked and form a single motor assembly. The two motors can be connected to a common rotor shaft or be connected to separate rotor shafts. FIG. 21 illustrates an axial flux electric machine with two axial flux electric machines 2100, 2110 that form a single motor assembly. The motor assembly includes two stators, each comprising a plurality of composite coils 2101 with rotors having permanent magnets 2102. The two rotors are connected to rotor shaft 2103 via rotor supports 2104. In alternative embodiments, the two rotors can be connected to different rotor shafts. In the illustrated embodiment, the two stators may be electrically connected, or they may be powered by entirely separate circuits.

While the specification has been described in detail with respect to specific embodiments of the invention, it will be appreciated that those skilled in the art, upon attaining an understanding of the foregoing, may readily conceive of alterations to, variations of, and equivalents to these embodiments. Although examples in the disclosure were generally directed to axial flux electric machines in the form of axial flux motors, embodiments disclosed herein are equally applicable to axial flux generators. As another example, the compound coils disclosed herein can be used in place of any of the individual coils described herein. Additionally, at any point that an interleaved composite material coil is mentioned, a standalone sheathed ribbon of conductive material could be used in its place. These and other modifications and variations to the present invention may be practiced by those skilled in the art, without departing from the scope of the present invention, which is more particularly set forth in the appended claims.

What is claimed is:

1. An axial flux electric machine comprising:
a stator having a plurality of pole pieces;
a rotor spaced apart from the stator in an axial direction of the axial flux electric machine;
a coiled ribbon of conductive material forming at least part of a pole piece in the plurality of pole pieces;
a coiled ribbon of soft magnetic material forming at least part of the pole piece;
wherein an axial direction of the coiled ribbon of conductive material is substantially parallel to the axial direction of the axial flux electric machine;
wherein the coiled ribbon of soft magnetic material and the coiled ribbon of conductive material are commonly coiled in an interleaved composite material coil; and
wherein the coiled ribbon of conductive material is at least partially sheathed in insulating material such that the coiled ribbon of conductive material comprises a conductive core that is insulated from ohmic contact in the interleaved composite material coil.

2. The axial flux electric machine of claim 1, wherein:
the coiled ribbon of conductive material is at least one of copper and aluminum; and
the coiled ribbon of soft magnetic material is at least one of iron, silicon steel, soft magnetic cobalt alloy, and amorphous steel.

3. The axial flux electric machine of claim 1, wherein:
the interleaved composite material coil forms the pole piece as a free-standing structure.

4. The axial flux electric machine of claim 1, wherein:
the coiled ribbon of conductive material includes at least two straight sides.

5. The axial flux electric machine of claim 1, wherein:
an outline of the coiled ribbon of conductive material forms a polygon.

6. The axial flux electric machine of claim 1, wherein:
the coiled ribbon of conductive material forms at least two full concentric turns.

7. The axial flux electric machine of claim 1, wherein:
an annulus defined by an innermost turn of the coiled ribbon of conductive material and an outermost turn of the coiled ribbon of conductive material forms at least half of a radial surface area of the pole piece.

8. The axial flux electric machine of claim 1, wherein:
the coiled ribbon of conductive material has a diameter, as measured in a radial direction of the coiled ribbon of conductive material, of at least half of a surface area of the pole piece in the radial direction of the axial flux electric machine; and
the coiled ribbon of conductive material is less than 1 millimeter thick as measured in the radial direction of the coiled ribbon of conductive material.

9. The axial flux electric machine of claim 1, wherein:
the coiled ribbon of conductive material forms the pole piece as a free-standing structure.

10. The axial flux electric machine of claim 9, further comprising:
a stator housing having a set of pole piece compartments;
wherein the pole piece is attached to the stator housing and fitted to a compartment in the set of pole piece compartments.

11. The axial flux electric machine of claim 1, wherein:
the coiled ribbon of conductive material is at least 1 millimeter wide as measured in the axial direction of the coiled ribbon of conductive material.

12. The axial flux electric machine of claim 11, wherein:
the coiled ribbon of conductive material is less than 1 millimeter thick as measured in a radial direction of the coiled ribbon of conductive material.

13. The axial flux electric machine of claim 1, further comprising:
a second rotor spaced apart from the stator in the axial direction of the axial flux electric machine and opposite the rotor; and
a rotor shaft fixedly connected to the rotor and the second rotor.

14. The axial flux electric machine of claim 1, wherein the coiled ribbon of conductive material:
coils from a first external electrical contact terminal towards a center of the pole piece in a first plane;
bends from the first plane to a second plane;
coils from the center of the pole piece to a second external electrical contact terminal in the second plane; and
forms a conductive pathway from the first external electrical contact terminal to the second external electrical contact terminal.

15. The axial flux electric machine of claim 1, further comprising:
a second stator spaced apart from the stator in the axial direction of the axial flux electric machine; and
a second rotor spaced apart from the second stator in the axial direction of the axial flux electric machine;
wherein: (i) energizing the stator causes the rotor to rotate; and (ii) energizing the second stator causes the second rotor to rotate.

16. The axial flux electric machine of claim 1, further comprising:
a first rotor shaft;
a second rotor shaft; and a mechanical differential assembly configured to allow relative rotational motion of the first rotor shaft and the second rotor shaft while transmitting torque from the rotor to the first rotor shaft and the second rotor shaft.

17. The axial flux electric machine of claim 1, wherein: the axial flux electric machine is an electric motor.

18. An axial flux electric machine comprising:
a stator having a plurality of pole pieces;
a rotor spaced apart from the stator in an axial direction of the axial flux electric machine;
a coiled ribbon of conductive material forming at least part of a pole piece in the plurality of pole pieces;
a second coiled ribbon of conductive material forming at least part of the pole piece;
a gap between the second coiled ribbon of conductive material and the coiled ribbon of conductive material in the axial direction of the axial flux electric machine; and
a coiled ribbon of soft magnetic material forming at least part of the pole piece;
wherein an axial direction of the coiled ribbon of conductive material is substantially parallel to the axial direction of the axial flux electric machine;
wherein the coiled ribbon of soft magnetic material and the coiled ribbon of conductive material are commonly coiled in an interleaved composite material coil;
wherein the coiled ribbon of conductive material is at least partially sheathed in insulating material such that the coiled ribbon of conductive material comprises a conductive core that is insulated from ohmic contact in the interleaved composite material coil; and
wherein: (i) the coiled ribbon of conductive material is coiled in a first direction; (ii) the second coiled ribbon of conductive material is coiled in the first direction; and (iii) the second coiled ribbon of conductive material and the coiled ribbon of conductive material are adjacent in the axial direction of the axial flux electric machine.

19. The axial flux electric machine of claim 18, wherein the second coiled ribbon of conductive material and the coiled ribbon of conductive material are less than 5 centimeters wide as measured in the axial direction of the axial flux electric machine.

20. The axial flux electric machine of claim 18, wherein: (i) the coiled ribbon of conductive material presents a first external electrical contact for the pole piece on an outermost turn of the coiled ribbon; (ii) the second coiled ribbon of conductive material presents a second external electrical contact for the pole piece on an outermost turn of the second coiled ribbon; and (iii) the first external electrical contact is ohmically coupled to the second external electrical contact through the coiled ribbon and the second coiled ribbon via a conductive path.

21. The axial flux electric machine of claim 20, further comprising:
a conductive pin that: contacts an innermost turn of the coiled ribbon and an innermost turn of the second coiled ribbon; and forms a part of the conductive path.

22. The axial flux electric machine of claim 20, further comprising:
a single ribbon of conductive material that forms the coiled ribbon of conductive material and the second coiled ribbon of conductive material; and
a fold in the single ribbon of conductive material that forms a part of the conductive path.

23. The axial flux electric machine of claim 20, wherein:
the coiled ribbon of conductive material and the second coiled ribbon of conductive material are part of a single continuous strip of conductive material; and
the conductive path includes a fold in the single continuous strip of conductive material that links the coiled ribbon of conductive material and the second coiled ribbon of conductive material.

24. The axial flux electric machine of claim 18, further comprising:
a first pair of coiled ribbons of conductive material, wherein the coiled ribbon of conductive material and the second coiled ribbon of conductive material form the first pair of coiled ribbons of conductive material; and
at least one additional pair of coiled ribbons of conductive material, wherein the at least one additional pair of coiled ribbons of conductive material and the first pair of coiled ribbons of conductive material form a set of pairs of coiled ribbons of conductive material;
wherein: (i) every coiled ribbon of conductive material in the set of pairs of coiled ribbons of conductive material is coiled in a first direction; (ii) each pair of coiled ribbons of conductive material in the set of pairs of coiled ribbons of conductive material has an inwardly coiled coil and an outwardly coiled coil; and (iii) the set of pairs of coiled ribbons of conductive material are arranged adjacently in the axial direction of the axial flux electric machine so that an inwardly coiled coil of one pair is never adjacent to an outwardly coiled coil of another pair.

25. The axial flux electric machine of claim 24, wherein: the gap is filled with thermally conductive oil.

26. An axial flux electric machine comprising:
a stator having a plurality of pole pieces;
a rotor spaced apart from the stator in an axial direction of the axial flux electric machine;
a coiled ribbon of conductive material forming at least part of a pole piece in the plurality of pole pieces;
a coiled ribbon of soft magnetic material forming at least part of the pole piece; and
a second coiled ribbon of conductive material forming at least part of the pole piece;
wherein: (i) the coiled ribbon of conductive material and the second coiled ribbon of conductive material are part of a single continuous strip of conductive material; and (ii) the second coiled ribbon of conductive material and the coiled ribbon of conductive material are adjacent in the axial direction of the axial flux electric machine;
wherein an axial direction of the coiled ribbon of conductive material is substantially parallel to the axial direction of the axial flux electric machine;
wherein the coiled ribbon of soft magnetic material and the coiled ribbon of conductive material are commonly coiled in an interleaved composite material coil;
wherein the coiled ribbon of conductive material is at least partially sheathed in insulating material such that the coiled ribbon of conductive material comprises a conductive core that is insulated from ohmic contact in the interleaved composite material coil; and
wherein: (i) the coiled ribbon of conductive material presents a first external electrical contact for the pole piece on an outermost turn of the coiled ribbon; (ii) the second coiled ribbon of conductive material presents a second external electrical contact for the pole piece on an outermost turn of the second coiled ribbon; (iii) the first external electrical contact is ohmically coupled to the second external electrical contact through the coiled ribbon and the second coiled ribbon via a conductive path; and (iv) the conductive path includes a pair of symmetrical folds in the single continuous strip of conductive material that links the coiled ribbon of conductive material and the second coiled ribbon of conductive material.

* * * * *